US010574107B2

(12) United States Patent
Smith et al.

(10) Patent No.: US 10,574,107 B2
(45) Date of Patent: *Feb. 25, 2020

(54) METHODS AND APPARATUS FOR SEGMENTED MACHINES HAVING MECHANICALLY AND ELECTRICALLY REMOVABLE MACHINE SEGMENTS

(71) Applicant: Boulder Wind Power, Inc., Louisville, DC (US)

(72) Inventors: James S. Smith, Lyons, CO (US); Marc W. Eichinger, Louisville, CO (US); Stephane A. Eisen, Louisville, CO (US); James D. Jore, Polson, MT (US); Michael A. Kvam, Polson, MT (US); Brian J. Sullivan, Boulder, CO (US)

(73) Assignee: BWP Group, Bristol, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,110

(22) Filed: Dec. 19, 2018

(65) Prior Publication Data

US 2019/0123607 A1     Apr. 25, 2019

Related U.S. Application Data

(63) Continuation of application No. 14/269,674, filed on May 5, 2014, now Pat. No. 10,177,620.

(51) Int. Cl.
*H02K 3/18*     (2006.01)
*H02K 3/26*     (2006.01)
(Continued)

(52) U.S. Cl.
CPC ............... *H02K 3/18* (2013.01); *H02K 3/26* (2013.01); *H02K 3/28* (2013.01); *H02K 11/30* (2016.01);
(Continued)

(58) Field of Classification Search
CPC ............ H02K 1/12; H02K 1/14; H02K 1/141; H02K 1/146; H02K 1/148; H02K 1/18;
(Continued)

(56) References Cited

U.S. PATENT DOCUMENTS 3,521,091 A   7/1970  Halas
3,641,429 A   2/1972  Cox, Jr. et al.
(Continued)

FOREIGN PATENT DOCUMENTS

CH   665303    4/1988
EP   1732011   12/2006
(Continued)

OTHER PUBLICATIONS

International Search Report and Written Opinion for International Application No. PCT/US2010/000112, dated Mar. 16, 2010.
(Continued)

*Primary Examiner* — Quyen P Leung
*Assistant Examiner* — Minki Chang
(74) *Attorney, Agent, or Firm* — Cooley LLP

(57) ABSTRACT

In some embodiments, a system includes a machine segment that includes multiple coils. Each coil is electrically isolated from the other coils in the machine segment, and each coil is electrically coupled to at least one electrical terminal to provide electrical access to the coil. Each electrical terminal provides electrical access to the coil to which it is electrically coupled such that the coil can be removably electrically coupled to an electrical circuit. The machine segment is also configured to be removably mechanically coupled to a second machine segment to form at least a portion of a stator or a portion of a rotor.

25 Claims, 9 Drawing Sheets

(51) Int. Cl.
*H02K 3/28* (2006.01)
*H02K 21/24* (2006.01)
*H02K 11/30* (2016.01)
*H02K 11/049* (2016.01)
*H02K 5/22* (2006.01)

(52) U.S. Cl.
CPC ............ *H02K 21/24* (2013.01); *H02K 5/225* (2013.01); *H02K 11/049* (2016.01); *H02K 2213/12* (2013.01)

(58) Field of Classification Search
CPC ............ H02K 1/182; H02K 3/18; H02K 3/26; H02K 3/28; H02K 3/50; H02K 3/52; H02K 11/0057; H02K 11/0094; H02K 11/04; H02K 11/049
USPC ........... 310/68 D, 156.32, 216.008, 216.009; 361/636, 640
See application file for complete search history.

(56) References Cited

U.S. PATENT DOCUMENTS

| | | |
|---|---|---|
| 3,719,845 A | 3/1973 | Takeda |
| 3,793,530 A | 2/1974 | Cater |
| 3,796,039 A | 3/1974 | Lucien |
| 3,845,339 A | 10/1974 | Merkle et al. |
| 4,035,659 A | 7/1977 | Jeppson |
| 4,096,625 A | 6/1978 | Morreale |
| 4,168,439 A | 9/1979 | Palma |
| 4,242,628 A | 12/1980 | Mohan et al. |
| 4,261,441 A | 4/1981 | Wood |
| 4,281,965 A | 8/1981 | Stjernholm |
| 4,291,233 A | 9/1981 | Kirschbaum |
| 4,292,532 A | 9/1981 | Leroux |
| 4,318,019 A | 3/1982 | Teasley et al. |
| 4,336,475 A | 6/1982 | Morinaga et al. |
| 4,418,287 A | 11/1983 | Syverson |
| 4,634,912 A | 1/1987 | Heyraud |
| 4,658,162 A | 4/1987 | Koyama et al. |
| 4,677,332 A | 6/1987 | Heyraud |
| 4,720,640 A | 1/1988 | Anderson et al. |
| 4,733,115 A | 3/1988 | Barone et al. |
| 4,763,053 A | 8/1988 | Rabe |
| 4,804,574 A | 2/1989 | Osawa et al. |
| 4,906,060 A | 3/1990 | Claude |
| 4,970,404 A | 11/1990 | Barger |
| 4,992,920 A | 2/1991 | Davis |
| 4,994,684 A | 2/1991 | Lauw et al. |
| 5,028,804 A | 7/1991 | Lauw |
| 5,083,077 A | 1/1992 | Wallace et al. |
| 5,097,167 A | 3/1992 | Kanayama et al. |
| 5,099,162 A | 3/1992 | Sawada |
| 5,237,230 A | 8/1993 | Sugiyama et al. |
| 5,239,251 A | 8/1993 | Lauw |
| 5,260,617 A | 11/1993 | Leibowitz |
| 5,289,042 A | 2/1994 | Lis |
| 5,299,913 A | 4/1994 | Heidelberg |
| 5,315,159 A | 5/1994 | Gribnau |
| 5,370,711 A | 12/1994 | Audit et al. |
| 5,418,446 A | 5/1995 | Hallidy |
| 5,439,488 A | 8/1995 | Audit et al. |
| 5,506,453 A | 4/1996 | McCombs |
| 5,525,894 A | 6/1996 | Heller |
| 5,587,643 A | 12/1996 | Heller |
| 5,589,722 A | 12/1996 | Sakaguchi et al. |
| 5,619,085 A | 4/1997 | Shramo |
| 5,637,945 A | 6/1997 | Yamamuro et al. |
| 5,723,933 A | 3/1998 | Grund et al. |
| 5,783,894 A | 7/1998 | Wither |
| 5,798,631 A | 8/1998 | Spee et al. |
| 5,798,632 A | 8/1998 | Muljadi |
| 5,841,208 A | 11/1998 | Abe |
| 5,842,312 A | 12/1998 | Krumme et al. |
| 5,844,324 A | 12/1998 | Spriggle |
| 5,844,341 A | 12/1998 | Spooner et al. |
| 5,986,438 A | 11/1999 | Wallace et al. |
| 6,016,015 A | 1/2000 | Willard, Jr. |
| 6,040,650 A | 3/2000 | Rao |
| 6,064,123 A | 5/2000 | Gislason |
| 6,066,945 A | 5/2000 | Shimazu et al. |
| 6,072,303 A | 6/2000 | Nickoladze et al. |
| 6,097,104 A | 8/2000 | Russell et al. |
| 6,153,944 A | 11/2000 | Clark |
| 6,157,147 A | 12/2000 | Lin |
| 6,160,336 A | 12/2000 | Baker, Jr. et al. |
| 6,163,097 A | 12/2000 | Smith et al. |
| 6,163,137 A | 12/2000 | Wallace et al. |
| 6,172,429 B1 | 1/2001 | Russell |
| 6,177,735 B1 | 1/2001 | Chapman et al. |
| 6,215,199 B1 | 4/2001 | Lysenko et al. |
| 6,246,125 B1 | 6/2001 | Axtell |
| 6,249,058 B1 | 6/2001 | Rea |
| 6,278,197 B1 | 8/2001 | Appa |
| 6,285,090 B1 | 9/2001 | Brutsaert et al. |
| 6,327,994 B1 | 12/2001 | Labrador |
| 6,359,401 B1 | 3/2002 | Garcia-Sinclair et al. |
| 6,373,161 B1 | 4/2002 | Khalaf |
| 6,392,371 B1 | 5/2002 | Cheng et al. |
| 6,411,002 B1 | 6/2002 | Smith et al. |
| 6,412,237 B1 | 7/2002 | Sahai |
| 6,426,580 B1 | 7/2002 | Ikeda et al. |
| 6,429,552 B2 | 8/2002 | Asao et al. |
| 6,452,287 B1 | 9/2002 | Looker |
| 6,476,513 B1 | 11/2002 | Gueorguiev |
| 6,476,534 B1 | 11/2002 | Vanderbeck et al. |
| 6,476,535 B1 | 11/2002 | Oohashi et al. |
| 6,483,199 B2 | 11/2002 | Umemoto et al. |
| 6,504,260 B1 | 1/2003 | Debleser |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,598,573 B2 | 7/2003 | Kobayashi |
| 6,641,367 B1 | 11/2003 | Van der Klippe |
| 6,661,146 B2 | 12/2003 | Oohashi et al. |
| 6,664,704 B2 | 12/2003 | Galley |
| 6,665,990 B1 | 12/2003 | Cody |
| 6,693,409 B2 | 2/2004 | Lynch et al. |
| 6,700,278 B1 | 3/2004 | Ehrfeld et al. |
| 6,741,000 B2 | 5/2004 | Newcomb |
| 6,781,276 B1 | 8/2004 | Stiesdal et al. |
| 6,794,777 B1 | 9/2004 | Fradella |
| 6,794,781 B2 | 9/2004 | Razzell et al. |
| 6,798,082 B1 | 9/2004 | Chen |
| 6,800,956 B2 | 10/2004 | Bartlett |
| 6,814,493 B2 | 11/2004 | Wobben |
| 6,826,874 B2 | 12/2004 | Takeuchi et al. |
| 6,833,633 B2 | 12/2004 | Wobben |
| 6,836,028 B2 | 12/2004 | Northrup et al. |
| 6,836,036 B2 | 12/2004 | Dube |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,853,094 B2 | 2/2005 | Feddersen et al. |
| 6,856,039 B2 | 2/2005 | Mikhail et al. |
| 6,876,176 B2 | 4/2005 | Stefanovi et al. |
| 6,891,302 B1 | 5/2005 | Gabrys |
| 6,897,577 B2 | 5/2005 | Weeber et al. |
| 6,903,466 B1 | 6/2005 | Mercier et al. |
| 6,909,211 B2 | 6/2005 | Ciciliani et al. |
| 6,911,741 B2 | 6/2005 | Pettersen et al. |
| 6,921,243 B2 | 7/2005 | Canini et al. |
| 6,929,671 B2 | 8/2005 | Kim et al. |
| 6,943,461 B2 | 9/2005 | Kaploun |
| 6,943,462 B2 | 9/2005 | Wobben |
| 6,943,478 B2 | 9/2005 | Zepp et al. |
| 6,946,750 B2 | 9/2005 | Wobben |
| 6,954,004 B2 | 10/2005 | Skeist et al. |
| 6,984,897 B2 | 1/2006 | Skeist |
| 7,004,724 B2 | 2/2006 | Pierce et al. |
| 7,011,598 B2 | 3/2006 | Flamang et al. |
| 7,019,413 B2 | 3/2006 | Kinoshita |
| 7,023,160 B2 | 4/2006 | Virtanen et al. |
| 7,042,109 B2 | 5/2006 | Gabrys |

(56) References Cited

U.S. PATENT DOCUMENTS

| | | |
|---|---|---|
| 7,042,110 B2 | 5/2006 | Mikhail et al. |
| 7,042,128 B2 | 5/2006 | Zepp et al. |
| 7,045,924 B2 | 5/2006 | Okura |
| 7,045,925 B2 | 5/2006 | Frager et al. |
| 7,049,719 B2 | 5/2006 | Wobben |
| 7,061,133 B1 | 6/2006 | Leijon et al. |
| 7,075,192 B2 | 7/2006 | Bywaters et al. |
| 7,081,696 B2 | 7/2006 | Ritchey |
| 7,084,520 B2 | 8/2006 | Zambrano et al. |
| 7,088,029 B2 | 8/2006 | Hiramatsu |
| 7,098,551 B2 | 8/2006 | Wobben |
| 7,105,941 B2 | 9/2006 | Hua |
| 7,105,975 B2 | 9/2006 | Semones et al. |
| 7,109,599 B2 | 9/2006 | Watkins |
| 7,109,625 B1 | 9/2006 | Jore et al. |
| 7,126,235 B2 | 10/2006 | Bernhoff et al. |
| 7,135,952 B2 | 11/2006 | Harding |
| 7,145,266 B2 | 12/2006 | Lynch et al. |
| 7,154,191 B2 | 12/2006 | Jansen et al. |
| 7,154,192 B2 | 12/2006 | Jansen et al. |
| 7,154,193 B2 | 12/2006 | Jansen et al. |
| 7,166,984 B1 | 1/2007 | Jones et al. |
| 7,170,212 B2 | 1/2007 | Balson et al. |
| 7,180,204 B2 | 2/2007 | Grant et al. |
| 7,186,083 B2 | 3/2007 | Bayly |
| 7,190,085 B2 | 3/2007 | Moehlenkamp |
| 7,190,101 B2 | 3/2007 | Hirzel |
| 7,205,678 B2 | 4/2007 | Casazza et al. |
| 7,215,038 B2 | 5/2007 | Bacon |
| 7,230,361 B2 | 6/2007 | Hirzel |
| 7,231,743 B2 | 6/2007 | Takeuchi et al. |
| 7,245,037 B2 | 7/2007 | Ängquist et al. |
| 7,253,543 B2 | 8/2007 | Akiyama |
| 7,289,329 B2 | 10/2007 | Chen et al. |
| 7,291,956 B2 | 11/2007 | Itoh et al. |
| 7,312,537 B1 | 12/2007 | Walling |
| 7,329,099 B2 | 2/2008 | Hartman |
| 7,332,837 B2 | 2/2008 | Ward et al. |
| 7,345,377 B2 | 3/2008 | Bacon |
| 7,345,449 B2 | 3/2008 | Barie et al. |
| 7,348,705 B2 | 3/2008 | Cai et al. |
| 7,355,309 B2 | 4/2008 | Costin et al. |
| 7,358,624 B2 | 4/2008 | Bacon |
| 7,365,472 B2 | 4/2008 | Hiramatsu |
| 7,372,174 B2 | 5/2008 | Jones et al. |
| 7,375,449 B2 | 5/2008 | Butterfield |
| 7,385,330 B2 | 6/2008 | Trzynadlowski et al. |
| 7,414,331 B2 | 8/2008 | Datta |
| 7,425,771 B2 | 9/2008 | Rivas et al. |
| 7,437,264 B2 | 10/2008 | Pierce et al. |
| 7,439,714 B2 | 10/2008 | Gonzalez et al. |
| 7,446,435 B2 | 11/2008 | Zhang et al. |
| 7,468,569 B2 | 12/2008 | Hirzel |
| 7,478,777 B2 | 1/2009 | Wobben |
| 7,482,720 B2 | 1/2009 | Gordon et al. |
| 7,525,228 B2 | 4/2009 | Chuang et al. |
| 7,538,446 B2 | 5/2009 | Bonnet |
| 7,545,052 B2 | 6/2009 | Gonzalez et al. |
| 7,573,173 B1 | 8/2009 | Frownfelter |
| 7,592,766 B2 | 9/2009 | Patel et al. |
| 7,595,574 B2 | 9/2009 | Ritchey |
| 7,612,463 B2 | 11/2009 | Cullen et al. |
| 7,633,770 B2 | 12/2009 | Datta et al. |
| 7,640,648 B1 | 1/2010 | Rittenhouse |
| 7,646,126 B2 | 1/2010 | Trzynadlowski et al. |
| 7,646,132 B2 | 1/2010 | Halstead |
| 7,646,178 B1 | 1/2010 | Fradella |
| 7,692,357 B2 | 4/2010 | Qu et al. |
| 7,710,081 B2 | 5/2010 | Saban et al. |
| 7,714,479 B2 | 5/2010 | Seneff et al. |
| 7,723,891 B2 | 5/2010 | Rittenhouse |
| 7,750,522 B2 | 7/2010 | Gizaw et al. |
| 7,781,932 B2 | 8/2010 | Jansen |
| 7,808,149 B2 | 10/2010 | Pabst et al. |
| 7,816,833 B2 | 10/2010 | Nair |
| 7,821,164 B2 | 10/2010 | Laskaris et al. |
| 7,830,057 B2 | 11/2010 | Gieras |
| 7,851,965 B2 | 12/2010 | Calley et al. |
| 7,852,643 B2 | 12/2010 | Zhang et al. |
| 7,888,839 B2 | 2/2011 | Gabrys et al. |
| 7,919,879 B2 | 4/2011 | Flannery et al. |
| 7,923,853 B2 | 4/2011 | Lewis |
| 7,923,886 B2 | 4/2011 | Calley et al. |
| 7,928,592 B2 | 4/2011 | Wagoner et al. |
| 7,939,959 B2 | 5/2011 | Wagoner et al. |
| 7,944,068 B2 | 5/2011 | Wagoner et al. |
| 8,097,970 B2 | 1/2012 | Hyvarinen |
| 8,115,348 B2 | 2/2012 | Hsu et al. |
| 8,138,620 B2 | 3/2012 | Wagoner et al. |
| 8,178,992 B1 | 5/2012 | Meller |
| 8,217,533 B2 | 7/2012 | Jones et al. |
| 8,222,792 B2 | 7/2012 | Platon et al. |
| 8,373,307 B2 | 2/2013 | Sihler et al. |
| 8,426,995 B2 | 4/2013 | Langel |
| 8,736,133 B1* | 5/2014 | Smith .................... H02K 21/24 310/208 |
| 8,785,784 B1* | 7/2014 | Duford .................... H02K 3/26 174/255 |
| 8,823,241 B2 | 9/2014 | Jore et al. |
| 9,762,099 B2 | 9/2017 | Jore et al. |
| 10,177,620 B2* | 1/2019 | Smith .................... H02K 21/24 |
| 2003/0020353 A1 | 1/2003 | Lopatinsky et al. |
| 2004/0021437 A1 | 2/2004 | Maslov et al. |
| 2004/0027020 A1 | 2/2004 | Newcomb |
| 2004/0041409 A1 | 3/2004 | Gabrys |
| 2004/0245866 A1 | 12/2004 | Lopatinsky et al. |
| 2005/0067910 A1 | 3/2005 | Okura |
| 2005/0120856 A1 | 6/2005 | Duford et al. |
| 2005/0285470 A1 | 12/2005 | Itoh et al. |
| 2006/0003604 A1 | 1/2006 | Angerpointner |
| 2006/0012263 A1 | 1/2006 | Smith et al. |
| 2006/0028092 A1 | 2/2006 | Wang et al. |
| 2006/0038405 A1 | 2/2006 | Xu et al. |
| 2006/0055265 A1 | 3/2006 | Zalusky |
| 2006/0202584 A1* | 9/2006 | Jore .................... H02K 21/24 310/179 |
| 2007/0152536 A1 | 7/2007 | Chuang et al. |
| 2008/0088200 A1 | 4/2008 | Ritchey |
| 2008/0100166 A1 | 5/2008 | Stahlhut et al. |
| 2008/0100174 A1 | 5/2008 | Stahlhut et al. |
| 2008/0231131 A1 | 9/2008 | Gabrys et al. |
| 2009/0101449 A1 | 4/2009 | Breidenstein et al. |
| 2009/0295231 A1 | 12/2009 | Gaffney et al. |
| 2010/0007225 A1 | 1/2010 | Platon et al. |
| 2010/0285702 A1 | 11/2010 | Platon |
| 2011/0006600 A1 | 1/2011 | Fontana et al. |
| 2011/0133461 A1 | 6/2011 | Hjort |
| 2011/0241630 A1 | 10/2011 | Ritchey et al. |
| 2011/0273048 A1* | 11/2011 | Jore .................... H02K 1/12 310/156.37 |
| 2011/0298310 A1 | 12/2011 | Ross et al. |
| 2012/0104894 A1 | 5/2012 | Van Den Bossche et al. |
| 2012/0133142 A1 | 5/2012 | Langel |
| 2012/0155131 A1 | 6/2012 | Moreno-Castaneda et al. |
| 2012/0175962 A1 | 7/2012 | Zhan et al. |
| 2012/0200177 A1 | 8/2012 | Atkinson et al. |
| 2012/0217746 A1 | 8/2012 | Groendahl et al. |
| 2012/0217831 A1 | 8/2012 | Jore et al. |
| 2012/0221159 A1 | 8/2012 | Olesen |
| 2012/0243274 A1 | 9/2012 | Feng et al. |
| 2012/0256422 A1 | 10/2012 | Fradella |
| 2013/0015703 A1 | 1/2013 | Rouse et al. |
| 2013/0320938 A1 | 12/2013 | Deng et al. |
| 2014/0306583 A1 | 10/2014 | Moller |
| 2015/0318751 A1 | 11/2015 | Smith et al. |
| 2016/0372995 A1 | 12/2016 | Smith et al. |

FOREIGN PATENT DOCUMENTS

| | | |
|---|---|---|
| EP | 1 834 917 A2 | 9/2007 |
| EP | 2 403 111 A1 | 1/2012 |
| EP | 2 685 602 A1 | 1/2014 |
| JP | 59-067860 | 4/1984 |

(56) References Cited

FOREIGN PATENT DOCUMENTS

| JP | S63-143077 U | 9/1988 |
| JP | 10-285894 A | 10/1998 |
| WO | WO 2010/083054 | 7/2010 |
| WO | WO 2012/093942 A1 | 7/2012 |

OTHER PUBLICATIONS

Wills, D., "Methods to Quantify and Reduce Rotor Losses in a Solid Rotor Yoke Permanent Magnet Machine," dated Mar. 2010.
Office Action for U.S. Appl. No. 14/193,012, dated Oct. 3, 2016, 14 pages.
Office Action for U.S. Appl. No. 14/269,674, dated Apr. 21, 2017.
Office Action for U.S. Appl. No. 14/269,674, dated Dec. 15, 2017, 29 pages.
Advisory Action for U.S. Appl. No. 14/269,674, dated Apr. 19, 2018, 4 pages.
Notice of Allowance for U.S. Appl. No. 14/269,674, dated Aug. 27, 2018, 11 pages.

\* cited by examiner

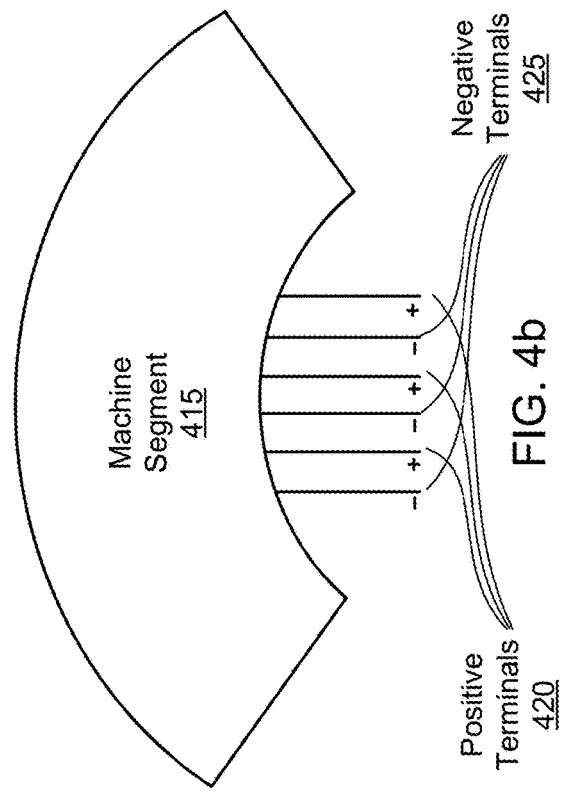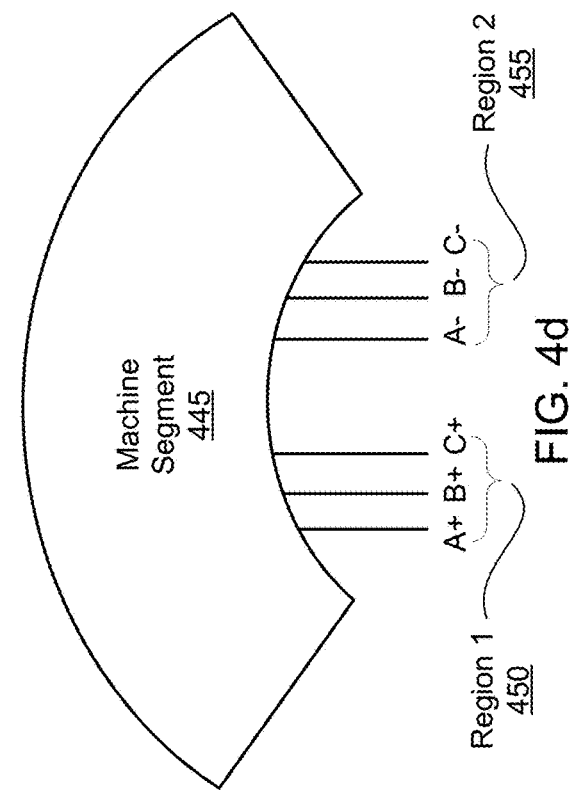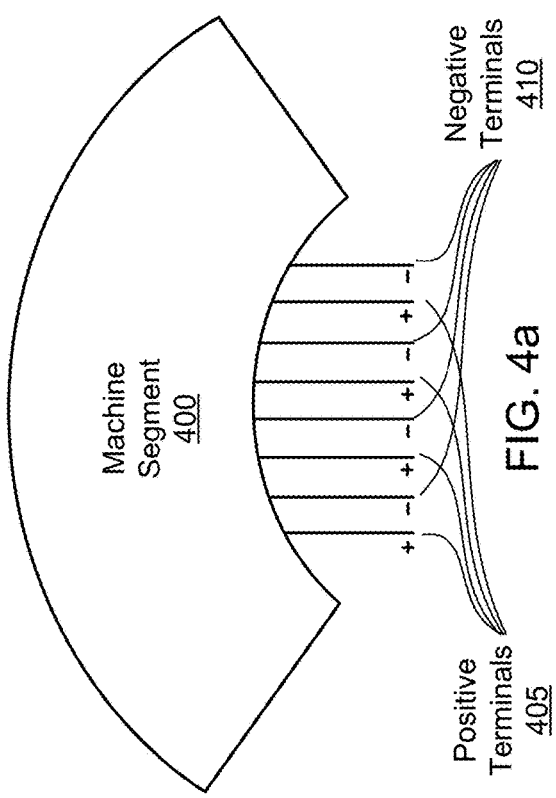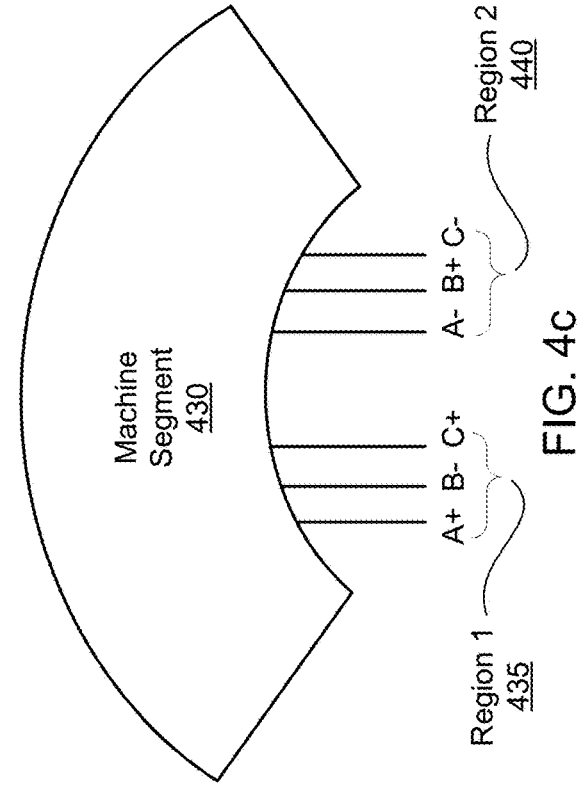

METHODS AND APPARATUS FOR SEGMENTED MACHINES HAVING MECHANICALLY AND ELECTRICALLY REMOVABLE MACHINE SEGMENTS

CROSS REFERENCE TO RELATED APPLICATIONS

This application is a continuation of U.S. patent application Ser. No. 14/269,674, filed May 5, 2014, and entitled "Methods and Apparatus for Segmenting a Machine," the disclosure of which is incorporated herein by reference in its entirety.

BACKGROUND

This invention relates to methods and apparatus for segmenting a machine.

In systems that include a power converter, it can be advantageous to connect multiple converters in parallel to, for example, achieve higher accrued power using relatively small power converters or to achieve system redundancy. There can be disadvantages, however, to such a system. For example, circulating electrical currents can result from even minor imbalances between converter and/or machine operation. Circulating currents generally do not produce any useful power and/or torque and can cause overheating of the converters and the associated electric machine. Additionally, some known segmented machines do not provide modular segments. For example, the segments are mechanically coupled within the machine and do not allow the segment to be easily removed without disassembling large portions of the machine. Similarly, the electrical connections can be difficult to disconnect to allow the segment to be moved or replaced.

Thus, there is a need for improved systems to reduce circulating currents and increase the modular aspects of segments in electric machines.

SUMMARY

In some embodiments, a system includes a machine segment that includes multiple coils. Each coil is electrically isolated from the other coils in the machine segment, and each coil is electrically coupled to at least one electrical terminal to provide electrical access to the coil. Each electrical terminal provides electrical access to the coil to which it is electrically coupled such that the coil can be removably electrically coupled to an electrical circuit. The machine segment is also configured to be removably mechanically coupled to a second machine segment to form at least a portion of a stator or a portion of a rotor.

BRIEF DESCRIPTION OF THE DRAWINGS

FIGS. 4a-4f illustrate machine segments, each according to an embodiment.

DETAILED DESCRIPTION

Figure 1:
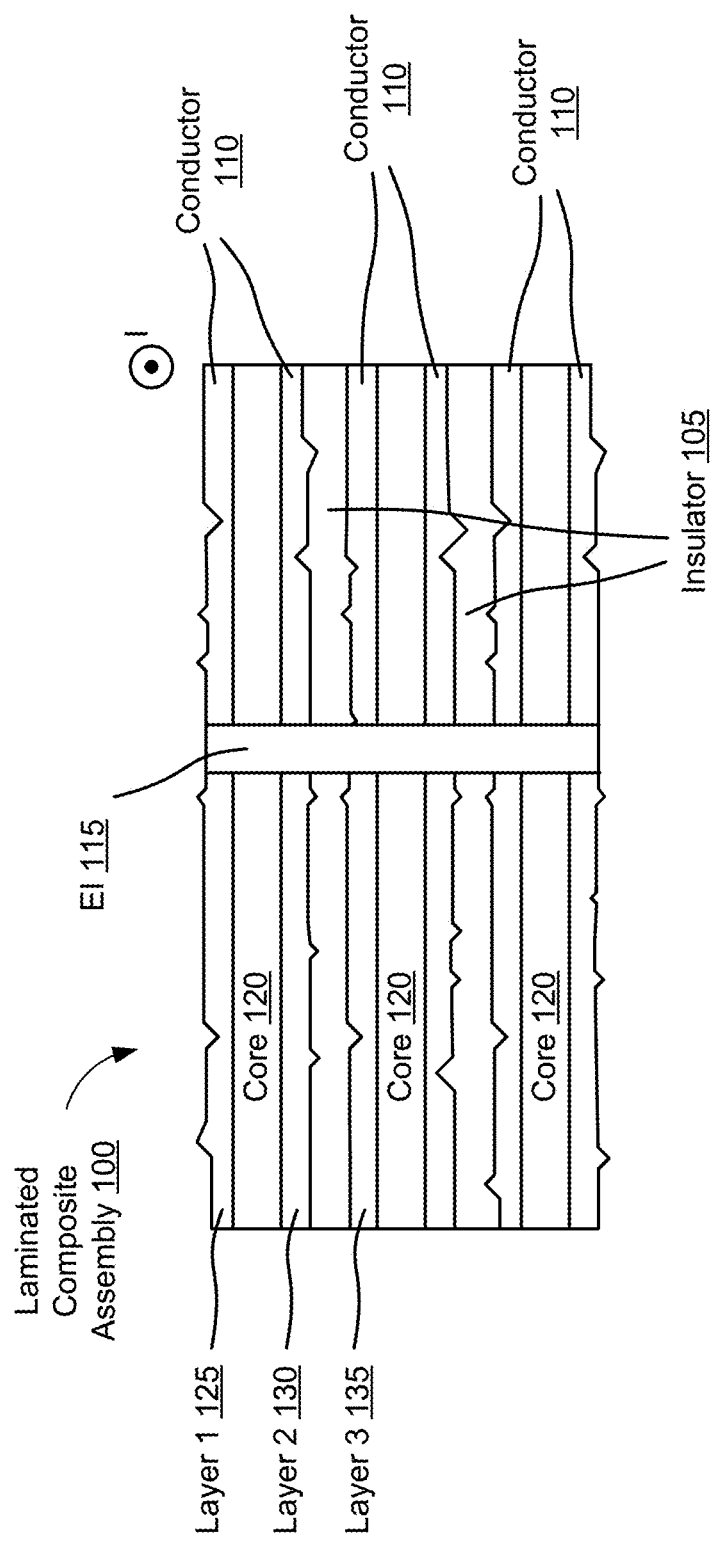
FIG. 1 illustrates a cross-sectional view of a portion of a laminated composite assembly, according to an embodiment.

In some embodiments, a system includes a machine segment that includes multiple coils. Each coil is electrically isolated from the other coils in the machine segment, and each coil is electrically coupled to at least one electrical terminal to provide electrical access to the coil. Each electrical terminal provides electrical access to the coil to which it is electrically coupled such that the coil can be removably electrically coupled to an electrical circuit. The machine segment is also configured to be removably mechanically coupled to a second machine segment to form at least a portion of a stator or a portion of a rotor.

In some embodiments, a system includes a conductor that forms a coil in a first machine segment of a multi-phase machine. The conductor is associated with an electrical phase of the multi-phase machine. The conductor is electrically coupled to a first terminal having a first polarity in the first machine segment. The first terminal is associated with the same electrical phase as the conductor and is physically and electrically accessible external to the first machine segment. The conductor is also electrically coupled to a second terminal having a second polarity that is substantially opposite the first polarity in the first machine segment. The second terminal is associated with the same electrical phase as the conductor and is physically and electrically accessible external to the first machine segment. The first machine segment is configured to be mechanically removably coupled to a second machine segment to form at least a portion of a stator or a portion of a rotor.

In some embodiments, a system includes a machine segment that has multiple electrical terminals and multiple coils. Each coil does not intersect the other coils within the machine segment, and each coil is electrically coupled to at least one unique electrical terminal to provide electrical access to the coil. When the machine segment is in a first configuration (e.g., associated with a first machine and/or a first electrical configuration), the machine segment is configured to be removably electrically coupled and/or removably mechanically coupled to an electrical circuit through the multiple electrical terminals. When in a second configuration (e.g., associated with a second machine and/or a second electrical configuration), the machine segment is configured to be removably electrically coupled and/or removably mechanically coupled to a second, distinct electrical circuit through the multiple electrical terminals.

As used herein, the singular forms "a," "an" and "the" include plural referents unless the context clearly dictates otherwise. Thus, for example, the term "a coil" is intended to mean a single coil or a combination of coils.

As used herein, the term "geometrically parallel" generally describes a relationship between two geometric constructions (e.g., two lines, two planes, a line and a plane or the like) in which the two geometric constructions are substantially non-intersecting as they extend substantially to infinity. For example, as used herein, a line is said to be geometrically parallel to another line when the lines do not intersect as they extend to infinity. Similarly, when a planar surface (i.e., a two-dimensional surface) is said to be geometrically parallel to a line, every point along the line is spaced apart from the nearest portion of the surface by a substantially equal distance. Two geometric constructions are described herein as being "geometrically parallel" or "substantially geometrically parallel" to each other when they are nominally parallel to each other, such as for example, when they are parallel to each other within a tolerance. Such tolerances can include, for example, manufacturing tolerances, measurement tolerances, or the like.

As used herein, when implemented in a radial machine, parallel layers may form non-intersecting arcs that have an axis of rotation substantially equal to the center of rotation for the radial machine. Furthermore, in some embodiments, operative conductors (e.g., a portion in which voltage is induced when exposed to an alternating magnetic field or a portion in which electrical current is provided to define a magnetic field, as described with respect to FIG. 6) that are described as parallel in a radial machine or an axial machine can be geometrically parallel as described above. Alternatively, in other embodiments, operative conductors that are described as parallel in a radial machine or an axial machine can be disposed in a radial direction. Conductors disposed in a radial direction can be non-intersecting within the machine.

As used herein, the term "electrically coupled in parallel" generally describes an electrical connection between two or more conductors in which the operating electrical current from an input region divides at a first point of common connection into each conductor before substantially recombining at a second point of common connection to an output region. Similarly stated, the two or more conductors are considered to be combined in an electrically parallel configuration. Conductors that are electrically coupled in parallel can be, but need not be, geometrically parallel. Similarly, geometrically parallel conductors can be, but need not be, electrically coupled in parallel. Furthermore, when two or more conductors are electrically coupled in parallel, a circulating electrical current can flow through the conductors such that the circulating electrical current flows in a circular pattern without passing through an input or output region, unlike operating current, which passes from an input region to an output region. Similarly stated, the circulating current in two or more conductors that are electrically coupled in parallel flows in one direction in at least one of the conductors and in the substantially opposite direction through at least one of the other conductors. In some instances, circulating currents flowing in parallel conductors can be superimposed in combination with an operative current flowing through parallel conductors, such that the net electrical current flows in a direction, with some conductors carrying more or less electrical current in that direction than in an instance of a conductor not experiencing circulating currents. Although the net electrical current passing through the parallel conductors in a direction can be the same in both instances, the imbalance of current between conductors that are electrically coupled in parallel can cause excessive heating, excessive temperatures, and other undesirable phenomenon.

As used herein, the term "electrically isolated" generally describes a relationship between two conductors within an area and/or volume. Specifically, if a first conductor is electrically isolated from a second conductor within an area, the first conductor does not intersect or otherwise have a substantial means of conducting electrical current with the second conductor within that area. The first conductor may, however, intersect or have a means of conducting electrical current with the second conductor outside the area. For example, two conductors can be electrically isolated from each other and/or non-intersecting within a winding region but electrically coupled to each other within a terminal region.

As used herein, the term "removably electrically coupled" generally refers to two or more electrically conductive components (e.g., conductors) that are coupled in such a way as to facilitate electrical conductivity between the components while simultaneously being coupled in such a way as to allow for electrical uncoupling without substantially destructing the components or segment of the machine in which the components reside. Stated another way, the electrical components can be electrically coupled in such a way that facilitates electrical connection and disconnection. Such a connection can include, for example, a pin and socket, a connector and receptacle, a plug, a spring-loaded connection, a louvered connection, a bolted connection, a screw terminal, and/or any other suitable construct that facilitates connection, disconnection, and reconnection as it relates to electrical conductivity. Such a connection construct can be chosen to facilitate, for example, installation, assembly, disassembly, reconnection, servicing, replacement, and/or the like.

As used herein, the term "removably mechanically coupled" generally refers to two or more components (e.g., machine segments) that are coupled in such a way as to allow for mechanical uncoupling of the two components without substantially destructing the components or portion of the machine in which they reside. Stated another way, the components can be coupled in such a way as to facilitate mechanical connection and disconnection. Such a connection can include, for example, the use of bolts, screws, or other fasteners; slotted interfaces; dovetailed interfaces; and/or any other suitable construct that facilitates mechanical connection, disconnection, and/or reconnection. Such a connection construct can be chosen to facilitate, for example, installation, assembly, disassembly, reconnection, servicing, replacement, and/or the like.

In some embodiments, components that are removably electrically coupled and removably mechanically coupled can use substantially the same construct for each, or use separate constructs for each. For example, a bolted connection between two components can be used to provide both electrical coupling and mechanical coupling. For another example, a slotted connection can be used to provide mechanical coupling and a plug and socket arrangement can be used to provide electrical coupling.

As used herein, the term "layer" generally describes a linear and/or non-linear two dimensional geometric construct and/or surface. For example, a layer can be a plane defined by multiple points on a conductor. As another example, a layer may be a non-planar construct defined by a non-planar portion of a laminated composite assembly. The layer may extend to infinity. Thus, if a first layer is substantially geometrically parallel to a second layer, the areas within and/or defined by the layers do not intersect as the layers extend to infinity. As described herein, a first non-linear layer is said to be geometrically parallel to a second non-linear layer if the first layer and the second layer do not intersect as the layers extend to infinity. Said another way, a first non-linear layer is said to be geometrically parallel to a second non-linear layer if a distance between the first layer and the second layer along a line normal to each layer (or normal to a line tangent to the point of intersection at each layer) is substantially constant. For yet another example, a planar and/or non-planar surface of a laminated composite assembly can also be referred to as a layer.

The embodiments described herein relate generally to conductive windings disposed on or included in a laminated composite assembly. As described in detail herein, a laminated composite assembly can be used to support a portion of an electronic circuit. For example, at least a portion of the laminated composite assembly (also referred to herein as "assembly") can form a portion of an integrated circuit (IC), a printed circuit board (PCB), a PCB assembly, an application-specific integrated circuit (ASIC), or any other suitable electronic circuit support structure. The assemblies described herein can include any suitable number of conducting layers that are separated by an electric insulator configured to substantially prevent electrical current from flowing between the conducting layers except in areas where the insulator is intentionally removed or otherwise displaced in order to allow such an electrical current to flow, such as in the case of an electrical interconnect. In other embodiments, the arrangements and methods described herein can be applied to, for example, wire-wound coils of an electromagnetic machine and/or iron-core electromagnetic machines, where the wire-wound coils and/or coupled circuits include conductors electrically connected in parallel that form a conductive loop that could permit circulating currents and their associated electrical losses.

FIG. 1 illustrates a cross sectional view of a portion of a laminated composite assembly 100 having insulators 105, cores 120, conductors 110, an electrical interconnect 115, and layers 125, 130, and 135. Laminated composite assembly 100 can be used to support a portion of an electric circuit including electrical conductors. For example, the portion of laminated composite assembly 100 can be a portion of an integrated circuit ("IC"), a printed circuit board ("PCB"), a PCB assembly, an application-specific integrated circuit ("ASIC"), or any other suitable electric circuit support structure.

Insulators 105 can be any suitable insulating material, such as, for example, epoxy, plastic, varnish, fiberglass, cotton, silicon, mica, and/or the like. Insulators 105 can be any material that can substantially electrically isolate a conductor 110 from other electrically operative components of the circuit (e.g., other conductors 110). For example, in FIG. 1 insulators 105 are disposed between conductors 110 to substantially prevent electrical current flow between the conductors (i.e., electrically isolate) except in areas where the insulator has been selectively removed or otherwise displaced to allow electrical current to flow between conductors, such as with electrical interconnect 115.

Conductors 110 can be any material configured to carry electrical current and/or that allows electrical current to flow. For example, conductors 110 can be copper, silver, aluminum, gold, zinc, tin, tungsten, graphite, conductive polymer, and/or any other suitable conductive material, including alloys, mixtures, and/or other combinations of the same. Conductors 110 can form part of the circuit of laminated composite assembly 100. In a circuit, a conductor 110 can be used to provide electrical conductivity between components and allow the flow of electrical current through the circuit. When, however, multiple layers (e.g., layers 125, 130, 135) are used in a laminated composite assembly, conductors on each layer generally do not have electrical current flow between each other unless some form of electrical interconnect is used (e.g., electrical interconnect 115) because the conductors are separated by electrically insulating material (e.g., insulators 105 or cores 120) that are intended to substantially prevent electrical current from flowing through the material to other conductive components.

Electrical interconnect 115 can be an electrical via, a solid electrical interconnect, a pressed pin electrical interconnect, a plated electrical interconnect that defines a lumen, a projection and/or protrusion from a conductive layer, and/or any other connection capable of providing electrical conductivity between layers of laminated composite assembly 100. In the case that electrical interconnect 115 defines a lumen, the lumen can remain empty (e.g., a cavity having air), be filled with a non-conductive material, or be filled with a conductive material. Electrical interconnect 115 is an electrically conductive component of a circuit that allows electrical current to flow between the layers of laminated composite assembly 100. As noted above, the conductors 110 on different layers of laminated composite assembly 100 are substantially electrically isolated from the conductors 110 on other layers because they are separated by core 120 and/or insulator 105. Electrical interconnect 115 provides electrical conductivity between conductors 110 through insulators 105 and/or cores 120.

Electrical interconnect 115 can be used in laminated composite assembly 100 to electrically couple one or more layers 125, 130, 135. For example, laminated composite assembly 100 can be a portion of a coil (e.g., included in a phase winding and/or a machine winding) such that an operative portion (e.g., a portion in which voltage is induced when exposed to an alternating magnetic field or a portion in which electrical current is provided to define a magnetic field, as described with respect to FIG. 6) of the coil is disposed on each layer 125, 130, 135 of laminated composite assembly 100, but the end turns of the coils are disposed on fewer than each layer (e.g., the first layer 125) of laminated composite assembly 100. Electrical interconnect 115 can electrically couple the layers 125, 130, 135 to allow the electrical current from each layer 125, 130, 135 in the operative portion of the coil to flow to a layer containing an end turn conductor (e.g., the first layer 125).

The cores 120 can be, for example, an electrically insulating material that can selectively isolate (e.g., selectively prevent and/or limit electrical current from flowing between) one or more conducting layers 125, 130, 135. In some embodiments, the core 120 can be an electrically insulating material such as, for example, FR-4 or the like. In other embodiments, the core 120 can be formed from any suitable electrically insulating material(s) such as, for example, fiberglass, cotton, or silicon and can be bound by any suitable resin material, such as, for example, epoxy. Similar to insulator 105, the core 120 substantially electrically isolates conductors 110 on different layers 125, 130, 135 from each other except where core 120 has been selectively removed or otherwise displaced to allow electrical current to flow between the conductors 110, such as with electrical interconnect 115.

Laminated composite assembly 100 can have multiple layers 125, 130, 135. Each layer can include one or more conductors disposed on a surface of a core that separates that layer from another layer on an opposite surface of the core. In some embodiments, a layer on a core can be separated from a layer on another core by an electrical insulator (e.g., a prepreg dielectric material). Thus, each layer can be separated by an electrically insulating material or a core that electrically isolates (i.e., substantially prevents electrical current from flowing between) the conductor on that layer from the conductors on the other layers. For example, the first layer 120 is electrically isolated from the second layer 130 by core 120, and the second layer 130 is electrically isolated from the third layer 135 by insulator 105. A conductor on a first layer can be electrically coupled and/or thermally coupled to a conductor on a second layer using an electrical interconnect (i.e., electrical interconnects 115), such as, for example, a via.

In use, operating electrical current I can flow out of the page as shown in FIG. 1. A conductor 110 carrying operating electrical current I can allow operating electrical current I to flow on that conductor 110. Insulators 105 and cores 120 can substantially prevent the operating electrical current I from flowing between conductors 110. An electrical interconnect 115 can electrically couple conductors 110 on different layers, thus allowing operating electrical current I to flow to conductors 110 on different layers. For example, operating electrical current I can flow from conductor 110 on the first layer 125 through electrical interconnect 115 to conductor 110 on the second layer 130.

While shown and described as operating electrical current in a single direction (generally referred to as "DC"), operating electrical current I can be DC or alternating current ("AC"). In AC embodiments, operating electrical current I can flow through conductors 110 and electrical interconnect 115 and is substantially prevented from flowing through cores 120 and insulators 105 except where the core 120 or insulator 105 has been removed or otherwise displaced to allow operating electrical current I to flow between the conductors 110, such as, for example, through electrical interconnect 115.

Figure 2A:
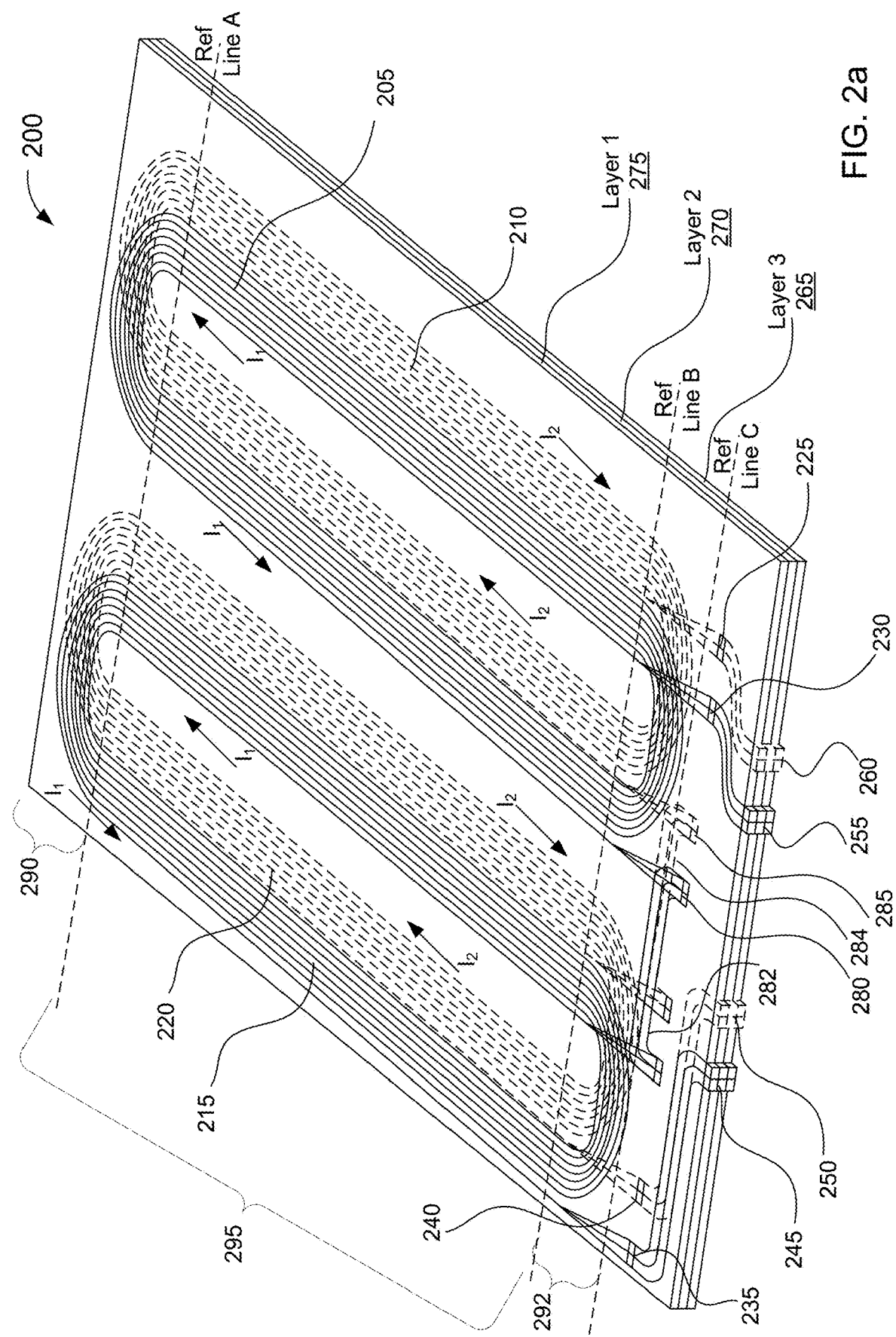
FIG. 2a illustrates a portion of a laminated composite assembly of an electrical machine, according to an embodiment.

FIG. 2a illustrates a portion of a laminated composite assembly 200 having coils 205, 210, 215, and 220, coil/terminal connections 225, 230, 235, and 240, externally accessible terminal connections 245, 250, 255, and 260, layers 265, 270, and 275, via pads 280 and 285, and internal buses 282 and 284. FIG. 1 can be, for example, a partial cross sectional view of the laminated composite assembly 200 of FIG. 2a (e.g., cut along reference line B). Laminated composite assembly 200 can be functionally and structurally similar to laminated composite assembly 100 as described with respect to FIG. 1.

Laminated composite assembly 200 can form a portion of one or more coils in a machine segment, such that it forms a segment of a stator or a segment of a rotor in an electrical machine (e.g., a generator or a motor). As described in further detail herein, multiple laminated composite assemblies 200 can be removably mechanically coupled to form at least a portion of a stator in an electrical machine.

Laminated composite assembly 200 can have multiple layers 265, 270, and 275. Each layer 265, 270, and 275 can be electrically isolated from the other layers through separation by a core or non-core electrical insulating material, such as insulator 105 or core 120 as described above with respect to FIG. 1. In some embodiments, layers 265, 270, and 275 are electrically isolated from each other except in areas where the core or non-core electrically insulating material is intentionally removed or otherwise displaced in order to allow an electrical current to flow, such as in the case of an electrical interconnect (e.g., electrical interconnect 115 of FIG. 1 or via pads 280, 285 in FIG. 2a).

The layers of laminated composite assembly 200 can include various portions of the coils 205, 210, 215, 220. For illustrative purposes in FIG. 2a, reference line A, reference line B, and reference line C can delineate different portions as used in some embodiments. The end turn portions 290 and 292 can include end turns of coils. The operative (non-curved as shown in FIG. 2a) portion 295 can include the conductors that extend between the end turn portions of the coils. In some embodiments the operative portion 295 can include conductors that are substantially linear and/or straight, as shown in FIG. 2a. In some embodiments the operative portion 295 can include conductors that are not substantially straight (e.g., curved, arced, trapezoidal, or any other shape). The operative portion 295 can include conductors in which voltage can be induced, such as, for example, in a motor or generator. Note that other conductors within the laminated composite assembly 200 can carry useful electrical current and/or be electrically coupled to the operative portion 295 of laminated composite assembly 200.

As shown in FIG. 2a, in some embodiments, coils 205 and 215 can be on the first layer 275. Coils 210 and 220 can be on the second layer 270. Alternatively, portions of a coil can exist on any layer, including multiple layers. Coils 205, 210, 215, and 220 can be structurally and functionally similar to conductors 110 of FIG. 1. In some embodiments, coils 205 and 215 can be electrically isolated from coils 210 and 220. As shown in FIG. 2a, coil 205 overlaps coil 210, but because they are on different layers, they can be electrically isolated by the core or insulator between the conductors that form the coils on the different layers. Coil 205 can be electrically coupled to coil 215 at via pad 280 through internal bus 282. Similarly, coil 210 can be electrically coupled to coil 220 at via pad 285 through internal bus 284, thus electrically coupling coil 210 to coil 220 in series.

While only two via pads 280, 285 are specifically called out in FIG. 2a, laminated composite assembly 200 can have greater or fewer via pads. Via pads 280, 285 can be a location on laminated composite assembly 200 for placing electrical interconnects that electrically couple conductors on one or more layers of laminated composite assembly 200. Electrical interconnects are more fully described with respect to FIG. 1.

A phase winding can include one or more coils carrying the operative electrical current in the machine for a specific electrical phase. For example, coils 205 and 215 in addition to internal bus 282 can form a portion of a phase winding. Similarly, coils 210 and 220 in addition to internal bus 284 can form a portion of a second phase winding. A machine winding can include one or more coils carrying the operative electrical current in the machine for the electrical phases of the machine. For example, the machine winding of a three phase machine can include coils for each of the three electrical phases. For another example, the machine winding of a single phase machine can include a coil for that single electrical phase. For example, coils 205, 210, 215, and 220 in addition to internal busses 282 and 284 can form a machine winding.

As shown in FIG. 2a, coils 205, 210, 215, and 220 can enclose an area in that the coil is disposed in operative section 295 and end turn sections 290 and 292. For example, coil 205 is disposed in section 295 such that operative electrical current $I_1$ can flow in the direction shown through operative portion 295, around end turn portion 290, back down operative portion 295, around end turn portion 292, and continue that pattern until the end of the coil is reached to flow to via pad 280.

Figure 2B:
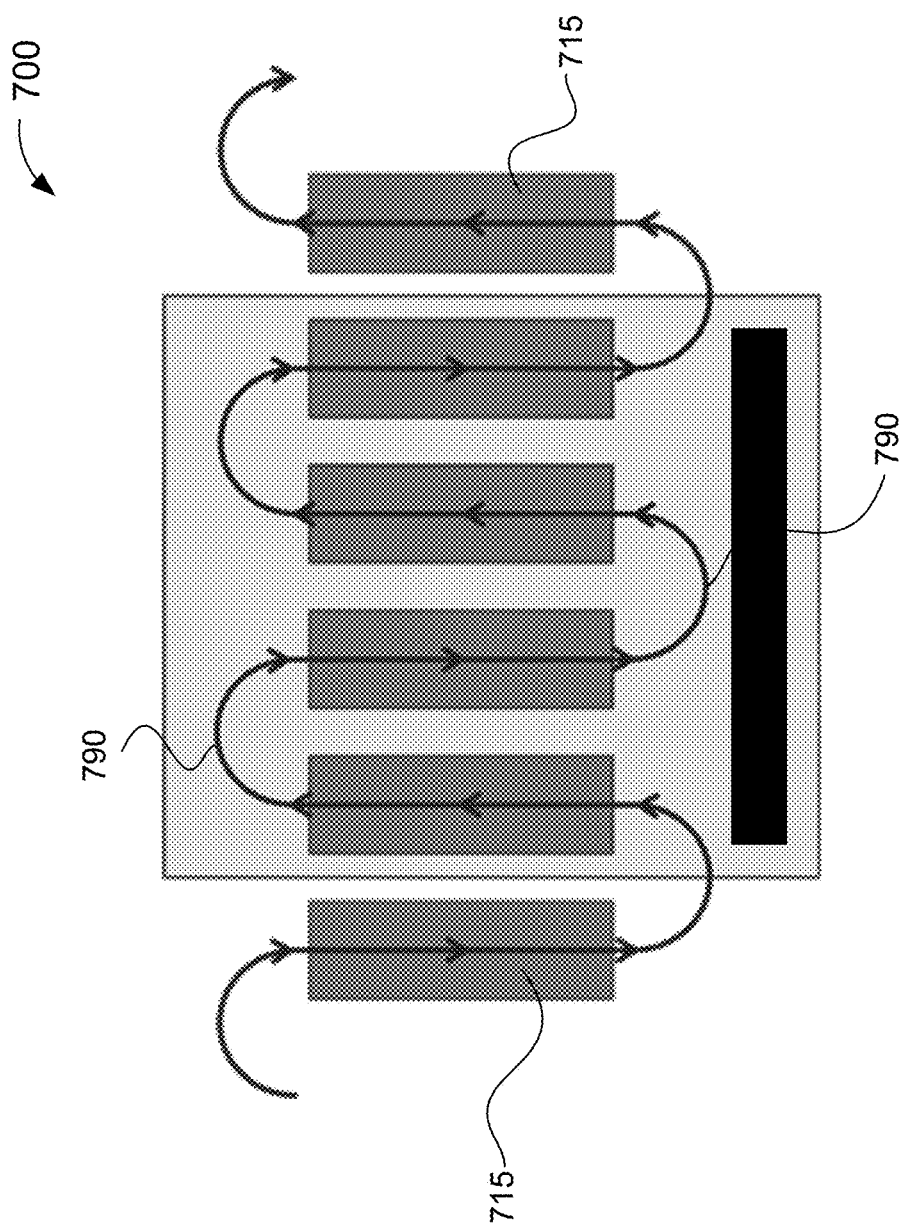
FIG. 2b illustrates a portion of a wave configuration of a winding, according to an embodiment.

While shown in FIG. 2a as being circular and circumscribing an area, in other embodiments a coil can include any other suitable pattern. For example, in some embodiments and as shown in FIG. 2b, a wave winding 700 can be used (e.g., a coil formed in a wave pattern). Such a wave winding coil can form a wave pattern rather than a circular pattern as described above. Specifically, the wave winding 700 can include multiple operative portions 715 (e.g., a portion in which voltage is induced when exposed to an alternating magnetic field or a portion in which electrical current is provided to define a magnetic field, as described with respect to FIG. 6) that can be similar to operative portion 295 of coils 205, 210, 215, and 220 as shown in FIG. 2a. Additionally, the wave winding 700 can include multiple end turn portions 790, each of which operatively couples two operative portions 715. Such end turn portions 790 can be similar to the end turn portions 290, 292 of coils 205, 210, 215, and 220 as shown in FIG. 2a.

Returning to FIG. 2a, in some embodiments, the conductors in the operative portion 295 on each layer can include conductors for each coil 205, 210, 215, and 220. The conductors in the end turn portions 290 for each coil can be on different layers, such that they do not intersect within a layer. The conductors in the operative portion 295 can be electrically coupled with the appropriate conductors in the end turn portion 290 using a via or other electrical interconnect. For example, while not shown in FIG. 2a, the conductors in the operative portion 295 for coil 205 can be on the first layer 275, the second layer 270, and the third layer 265. The conductor in the end turn portion 290 for coil 205 can be on the first layer 275, but not the second layer 270 or the third layer 265. The conductors in the operative portion 295 on the first layer 275, the second layer 270, and the third layer 265 of coil 205 can be electrically coupled near reference line A to the conductor in the end turn portion 290 on the first layer 275 of coil 205 using a via or other electrical interconnect. Accordingly, in use, electrical current flowing on the operative portions 295 of coil 205 on the second layer 270 or the third layer 265 can flow to the end turn portion 290 of coil 205 and on the first layer 275 through a via or other electrical interconnect. The other coils 210, 215, and 220 can be similarly electrically coupled between their end turn portions 290 and operative portions 295 such that the conductors in the end turn portion 290 for each coil (205, 210, 215, and 220) is on one or more layers (265, 270, and 275), but the conductors in the operative portion 295 for each coil (205, 210, 215, and 220) is on one or more layers (265, 270, and 275).

In such embodiments, while the conductors in the operative portion 295 for each coil 205, 210, 215, 220 are on the same layer or layers (265, 270, 275) as other conductors in the operative portion 295 for other coils 205, 210, 215, 220, the conductors for each coil 205, 210, 215, 220 are electrically isolated. For example, the conductors in the operative portion 295 for coil 205 can be on the first layer 275, the second layer 270, and the third layer 265, and the conductors in the operative portion 295 for coil 210 can be on the first layer 275, the second layer 270, and the third layer 265. Even though the conductors for each coil 205 and 210 are on each layer 265, 270, and 275, the coils 205 and 210 can be electrically isolated using an insulator or non-conductive electrically insulating material that substantially prevents electrical current from flowing between the conductors of coil 205 and the conductors of coil 210.

Coils 205 and 215 can be associated with an electrical phase (e.g., phase A). As seen in FIG. 2a, coils 205 and 215 can be electrically coupled at via pad 280, so the electrical phase associated with the coils 205, 215 within a machine segment can be the same electrical phase. Coils 210 and 220 can be associated with a second electrical phase (e.g., phase B). Coils 210 and 220 can be electrically isolated from coils 205 and 215. The overlapping portions of coil 215 and 220 and the overlapping portions of coil 205 and 210 (i.e., the end turn portions 290, 292) are on different layers. In some embodiments, a different electrical phase can be associated with each layer or some other subset of the total number of layers in a multi-phase machine.

As described above, in some embodiments, the operative portion 295 of the conductors on each layer can include conductors for each coil 205, 210, 215, and 220. In such embodiments, the operative portion 295 of the conductors associated with each electrical phase in the multi-phase machine can be on each layer 265, 270, 275. In the end turn portion 290, the conductors associated with each electrical phase can be on different layers 265, 270, 275. In such configurations, the electrical phases remain electrically isolated, as described above.

Coil/terminal connection 225, 230, 235, and 240 can be an electrical coupling of the winding portion to the terminal portion of the conductor. In some embodiments, the conductor is a continuation of the conductor from the winding portion of the conductor to the terminal portion of the conductor. In some embodiments, the winding portion of the conductor is coupled to the terminal portion of the conductor through an electrical interconnect (e.g., similar to electrical interconnect 115 of FIG. 1).

Terminal connections 245, 250, 255, and 260 can be any coupling mechanism. Coupling mechanisms can include, for example, electrical clips, conductive pins that connect to a conductive receptacle for the pin, or any other suitable conductive coupling mechanism. The terminal connections 245, 250, 255, and 260 can be externally accessible such that laminated composite assembly 200 can be electrically and mechanically coupled to an electrical circuit or component and removed from that electrical circuit both mechanically and electrically. Electrical circuits to which laminated composite assembly 200 can be coupled can include, for example, a power converter, a load circuit, a source circuit, a circuit that functions as a load in some configurations and as a source in other configurations, or any other suitable electrical circuit. In some embodiments, terminal connections 245, 250, 255, and 260 can provide the electrical as well as the mechanical coupling mechanism for electrically and mechanically removably coupling the laminated composite assembly 200 to an electrical circuit or component. For example, the terminal connections 245, 250, 255, and 260 can conductively bolt the laminated composite assembly 200 to the electrical circuit or component. In other embodiments, terminal connections 245, 250, 255, and 260 provide the electrical coupling mechanism while the mechanical coupling can be provided through a non-conductive method. For example, the terminal connections 245, 250, 255, and 260 can include electrical clips while the mechanical coupling mechanism can include a removable mechanism (e.g., bolts, clips, pressure pins, etc.) that can, for example in a non-conductive area, mechanically couple the laminated composite assembly 200 to the mechanical structure (e.g., PCB) of the electrical circuit or component.

Each terminal connection 245, 250, 255, 260 can have a polarity, conventionally described as either electrically positive or electrically negative. In AC embodiments, the polarity of each terminal connection 245, 250, 255, and 260 can alternate. Terminal connections at opposite ends of a machine winding can maintain an opposite polarity. For example, each electrical phase can include two terminals at opposite ends of a machine winding, one terminal being electrically positive and the other being electrically negative. Similarly stated, as an example, terminal connection 255 is electrically coupled to coil 205. Coil 205 is electrically coupled to coil 215. Coil 215 is electrically coupled to terminal connection 245. Thus, in some instances, terminal connection 245 can be electrically negative and terminal connection 255 can be electrically positive. In other instances, terminal connection 245 can be electrically positive and terminal connection 255 can be electrically negative. Similarly, in some instances terminal connection 260 can be electrically positive and terminal connection 250 can be electrically negative. In other instances, terminal connection 260 can be electrically negative, and terminal connection 250 can be electrically positive.

The alternative terminal connection polarities as described above apply equally to both AC and DC embodiments. Though AC embodiments have electrical current that reverses polarity, the terminals can still have one electrically positive terminal and one electrically negative terminal associated with each phase winding. In such embodiments, terminal connection 245 can alternate between electrically positive and electrically negative while terminal connection 255 can alternate oppositely between electrically negative and electrically positive such that when terminal connection 245 is electrically positive, terminal connection 255 is electrically negative and vice versa. Similarly, terminal connection 250 can alternate between electrically positive and electrically negative while terminal connection 260 can alternate oppositely between electrically negative and electrically positive such that when terminal connection 245 is electrically positive, terminal connection 255 is electrically negative and vice versa. The terminals on opposite ends of a circuit operating with AC power can be referred to synonymously as, for example, A+ and A−, A and A-bar, or A and $\overline{A}$. In the nomenclature used within this description, A or A+ refers to a first electrical terminal for phase A that has a first terminal polarity (e.g., positive). A−, A-bar, or $\overline{A}$ refers to a second electrical terminal for phase A that is on the opposite electrical end of phase A or A+ and has a second terminal polarity that is opposite from the first terminal polarity (e.g., negative). As such, the indication of A+, A−, A, A-bar, or $\overline{A}$ as applied to a terminal is intended to reflect a particular convention of terminal polarity for a terminal associated with electrical phase A, rather than a convention of absolute terminal polarity.

Laminated composite assembly 200 can be mechanically removably coupled and/or electrically removably coupled to other laminated composite assemblies 200 to form at least a portion of a segmented stator. For example, laminated composite assembly 200 can be bolted in a non-conductive area to a non-conductive area of a second laminated composite assembly 200. Mechanically coupling multiple laminated composite assemblies together can provide a configuration that allows voltage to be induced in the operative portions 295 of the coils 205, 210, 215, 220 of laminated composite assemblies 200. As shown in more detail below with respect to FIGS. 3a-6, the terminal connections 245, 250, 255, 260 can be electrically coupled to power converters such that voltage induced in the operative portion 295 of the coils 205, 210, 215, 220 can drive an electrical current to be collected and converted for use in a larger system (e.g., coupled to a power grid).

In use, operative electrical currents $I_1$ and $I_2$ can flow in the directions shown in FIG. 2a. While operative electrical currents $I_1$ and $I_2$ are shown as having a direction, the direction of operative electrical currents $I_1$ and $I_2$ can refer to either direct current (DC) or alternating current (AC). For example, operative electrical current $I_1$ can be associated with an electrical phase and driven by voltage induced in the operative portion 295 of coils 205 and 215. Similarly, operative electrical current $I_2$ can be associated with an electrical phase and driven by voltage induced in the operative portion 295 of coils 210 and 220. In some embodiments, operative electrical current $I_1$ can be associated with the same electrical phase as operative electrical current $I_2$. In other embodiments, operative electrical current $I_1$ can be associated with a different electrical phase as operative electrical current $I_2$. In some embodiments, operative electrical currents $I_1$, $I_2$ can be supplied to the coils from a source circuit.

Operative electrical current $I_1$ can flow from terminal connection 255 through coil/terminal connection 230 and into coil 205. From there, operative electrical current $I_1$ can flow through the coil 205 into coil 215 through via pad 280. Once through the conductors of coil 215, operative electrical current $I_1$ can flow through coil/terminal connection 235 and out terminal connection 245.

Operative electrical current $I_2$ can flow from terminal connection 250 through coil/terminal connection 240 to coil 220. As shown, operative electrical current $I_2$ can flow in substantially the opposite direction to, or at some different electrical phase angle than operative electrical current $I_1$ flowing through coils 205 and 215. Because the coils 215 and 205 are electrically isolated from coils 210 and 220, the operative electrical current can flow in substantially opposite directions or different phase angles. For example, for three electrical phase (A, B, and C) power, a phase angle a separation of 120 degrees can be included between phase A and phase B, between phase B and phase C, and between phase C and phase A. In some embodiments, the reference phase angle for phase A is −60 degrees, the reference phase angle for phase B is 0 degrees, and the reference phase angle for phase C is 60 degrees, which is, for example, a 60 degree phase angle separation between phase A and phase B rather than a 120 degree phase angle separation. In such embodiments, the 120 degree phase angle separation can be achieved by adjusting the reference phase angle for phase B by 180 degrees such that the reference phase angle for phase A is −60 degrees, the reference phase angle for phase B is 180 degrees, and the reference phase angle for phase C is 60 degrees, making the phase angle separation between electrical phases equal to 120 degrees. The same concept can apply to any number of electrical phases. As applied to FIG. 2a, for example, operative electrical current $I_1$ can be phase A and operative electrical current $I_2$ can be phase B. For another example, operative electrical currents $I_1$ and $I_2$ can be induced in the operative portion 295 of the coils 205, 210, 215, 220 such that both electrical currents can flow in the direction shown for operative electrical current $I_1$. Operative electrical current $I_2$ can be configured to flow in substantially the opposite direction (i.e., the direction shown in FIG. 2a for $I_2$) by reversing the polarity of the terminal connections 250 and 260.

Figure 3A:
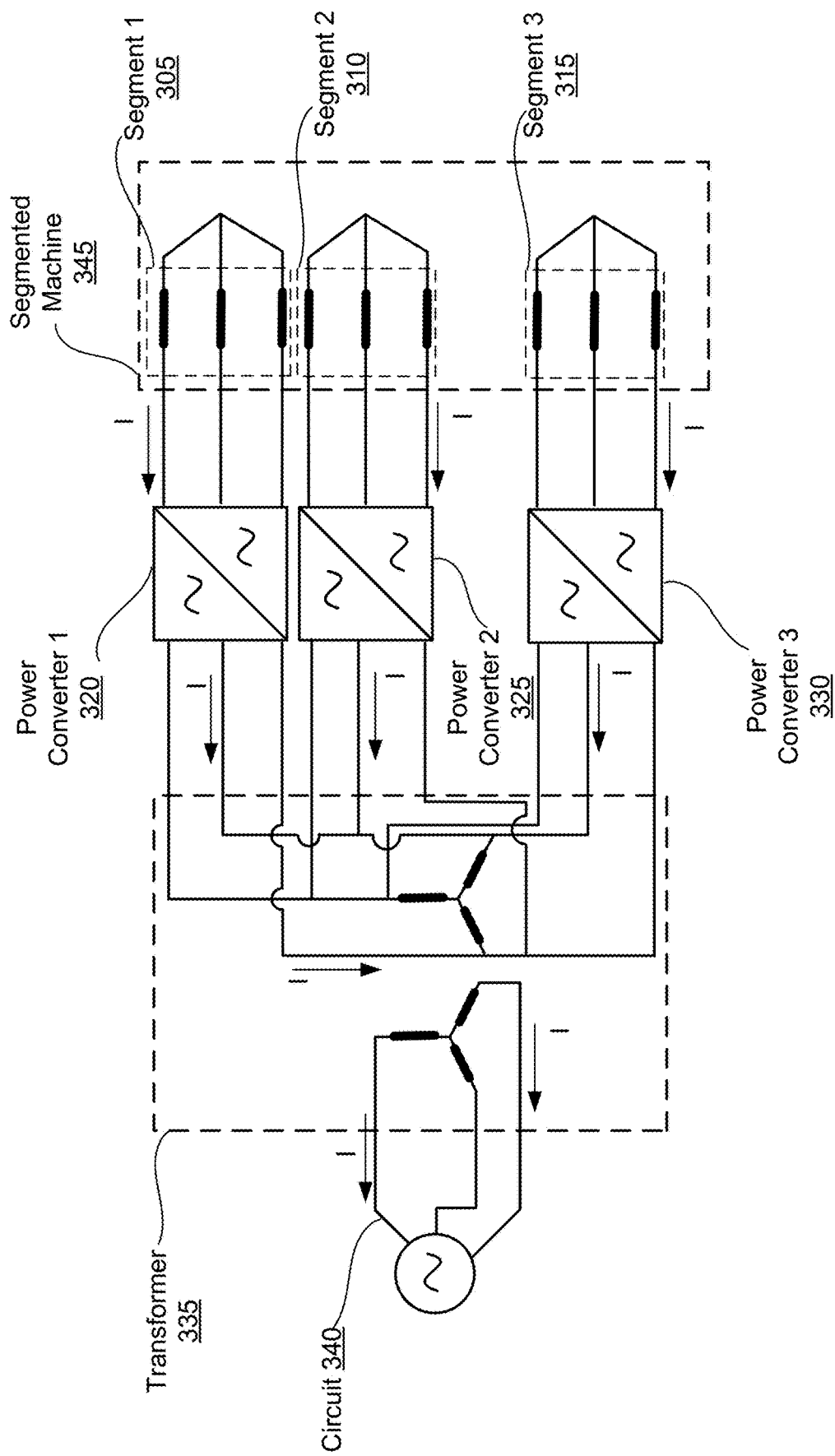
FIG. 3a illustrates a schematic view of a segmented multi-phase machine, according to an embodiment.

FIG. 3a illustrates a schematic view of a power system including a circuit 340, a transformer 335, multiple power converters 320, 325, and 330, and a segmented machine 345 having multiple segments 305, 310, and 315.

In some embodiments, circuit 340 can be a power grid or other load to which the machine 345 provides power in the case that the machine 345 is a generator. In other embodiments, circuit 340 can be a power source in the case that the machine 345 is a motor.

In some embodiments, transformer 335 can at least partially transform the power from the power converters 320, 325, 330 to the proper voltage, electrical current, and impedance for the circuit 340. Transformer 335 can be any transformer configured to provide the power from the power converters 320, 325, and 330 to the circuit 340. Transformer 335 can include, for example, two coils that are positioned closely (such as around a common iron core) such that the electrical current flowing in the first coil can induce electrical current in the second coil. In some embodiments, transformer 335 can isolate the power converters 320, 325, 330 from the circuit 340.

Segmented machine 345 can be a machine having multiple segments. In FIG. 3a, segmented machine 345 has three segments 305, 310, and 315. In other embodiments, segmented machine 345 can have any number of segments, including more than three or less than three. Segmented machine 345 can include a common and/or shared rotating or translating body. In some embodiments, segments 1, 2 and 3 can be mechanically coupled together or to a common support structure to describe a single stator or rotor and the segments 305, 310, 315 share a single translating or rotating body.

As shown in FIG. 3a, each segment 305, 310, and 315 can be electrically independent from the other segments. Similarly stated, until reaching the transformer 335, each segment 305, 310, and 315 can be electrically isolated from the other segments.

Each segment 305, 310, and 315 can be a segment as described in FIG. 2a. For example, segment 305, 310, and/or 315 can be formed to include one or more laminated composite assemblies substantially similar to laminated composite assembly 200. In some embodiments and as shown in FIG. 2a, each segment can include coils associated with three electrical phases. In this configuration, one terminal connection associated with each electrical phase can be removably electrically coupled to a power converter and the other terminal connection associated with each electrical phase can be externally and removably electrically coupled in a star (e.g., wye) configuration to the second terminal connections from coils associated with the other electrical phases, as shown in FIG. 3a. For example, the first segment 305 is configured such that one terminal connection associated with each electrical phase is connected in a star configuration with one terminal connection associated with each of the other two electrical phases external to each of the machine segments 305, 310, and 315. The second terminal connection from each electrical phase of the first segment 305 is externally and removably electrically coupled to the first power converter 320.

While shown in FIG. 3a as connected in a star configuration, each machine segment 305, 310, and 315 can be externally and removably electrically coupled in any suitable configuration, including star (e.g., wye), delta and/or the like. As shown in FIG. 3a, the terminal connections for each electrical phase in each segment (305, 310, 315) are electrically coupled in a star configuration external to the segments (305, 310, 315). Furthermore, while shown in FIG. 3a as having three electrical phases, the machine segments 305, 310, and 315, and therefore segmented machine 345, can have any number of electrical phases.

Each segment 305, 310, and 315 can be externally and removably electrically coupled to an associated power converter 320, 325, and 330, as shown in FIG. 3a. For example, as shown in FIG. 3a, the first segment 305 is externally and removably electrically coupled to the first power converter 320, the second segment 310 is externally and removably electrically coupled to the second power converter 325, and the third segment 315 is externally and removably electrically coupled to the third power converter 330.

Though segments 305, 310, and 315 are electrically isolated from each other, the segments can be mechanically coupled to form at least a portion of a machine segment. The mechanical coupling will be described further herein with respect to FIGS. 4a-4f.

Each power converter 320, 325, and 330 is electrically isolated from the other power converters. At the transformer 335, however, the outputs of the power converters can be electrically coupled to combine the power for transfer to the circuit 340.

Each power converter 320, 325, and 330 can include any circuit that converts power to the proper electrical phase or phases, frequency, voltage, and/or electrical current from one side of the converter to the other. For example, in FIG. 3a, for simplicity sake electrical current I is described as flowing in the direction shown. Electrical current I can flow from, for example, the first machine segment 305 through the first power converter 320 to the transformer 335. The first power converter 320 can convert electrical current I from the segment side of the first power converter 320 to be compatible with the circuit and power on the transformer side of the first power converter 320. The second power converter 325 and the third power converter 330 can function in substantially the same way as the first power converter 320. In some embodiments, power converters 320, 325, and 330 can, for example, convert AC received from the segmented machine 345 to DC and then convert the DC electrical power to AC electrical power suitable for circuit 340.

In use, electrical current I can flow in the direction shown. In a generator configuration, electrical current I can be induced in each segment 305, 310, and 315. Electrical current I can flow to the associated power converters 320, 325, and 330. At the power converters 320, 325, and 330, the electrical current I can be appropriately converted for transfer to the circuit 340. Electrical current I can flow to transformer 335 for transfer to circuit 340. Because the segments 305, 310, and 315 are electrically isolated, electrical current flow between the segments 305, 310, 315 is substantially eliminated.

While the arrows in FIG. 3a suggest a certain direction of electrical current flow, the direction can refer to a positive convention for either DC or AC. For example, the electrical current induced in segmented machine 345 can be AC. The electrical current transferred between circuit 340 and power converters 320, 325, 330 can be AC. Power converters 320, 325, and 330 can convert the AC to DC, however, the input and/or output on either side of power converters 320, 325, 330 can be AC.

Figure 3B:
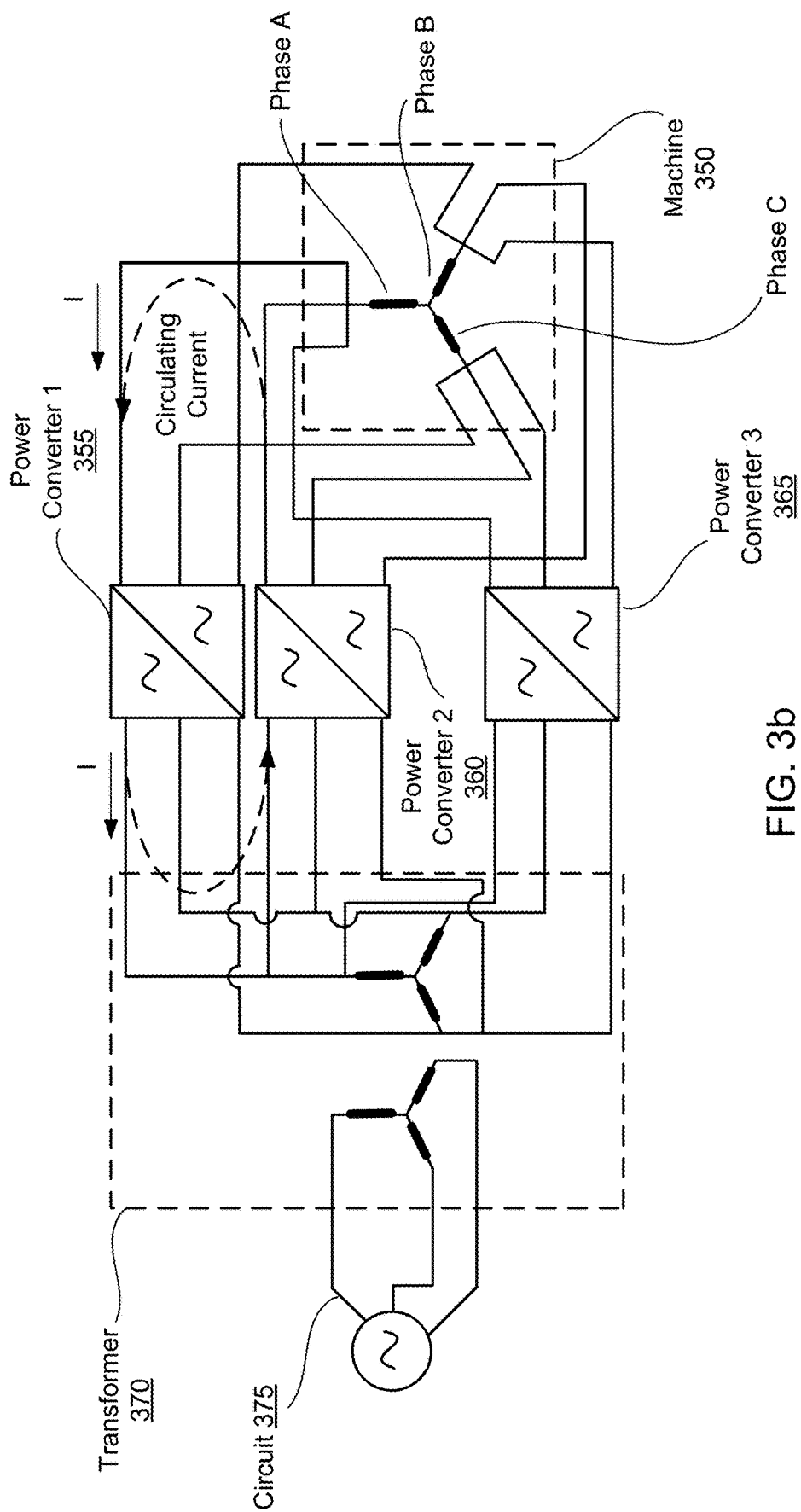
FIG. 3b illustrates a schematic view of a multi-phase machine having multiple power converters.

An advantage of this configuration is that because the segments 305, 310, 315 are electrically isolated from each other, substantially no electrical current can circulate between segments. Such circulating currents, as described in more detail below with respect to FIG. 3b, are generally not useful electrical current and do not generate useful torque and/or power. Moreover, circulating electrical currents can cause excessive heating in the power converters 320, 325, 330 and segments 305, 310, 315.

FIG. 3b is a schematic view of a power system including a circuit 375, transformer 370, power converters 355, 360, and 365, and a machine 350. Circuit 375 can be functionally and structurally similar to the circuit 340 of FIG. 3a. Transformer 370 can be structurally and functionally similar to transformer 335 of FIG. 3a. Power converters 355, 360, and 365 are structurally and functionally similar to the power converters 320, 325, and 330 of FIG. 3a.

Machine 350 is depicted as a three phase machine, but can be any number of electrical phases. As shown in FIG. 3b, Phase A of machine 350 is electrically coupled to the first power converter 355, the second power converter 360, and the third power converter 365. Similarly, phases B and C are also electrically coupled to each power converter 355, 360, and 365.

Machine 350 is not a segmented machine. Because machine 350 is not segmented, the phase windings for each electrical phase are not electrically isolated within the machine. In use, electrical current I can flow in the direction shown in FIG. 3b. Electrical current I can flow from phase A of machine 350 to the first power converter 355. Once converted, electrical current I can flow from the first power converter 355 to the transformer 370. Once transformed, electrical current I can flow to circuit 375.

As shown in FIG. 3b, circulating electrical currents can be generated between the different power converters because of their parallel electrical connections at the machine terminals. For example, the conductor related to phase A that is coupled to the first power converter 355 can have a common mode circulating electrical current that circles back through the conductor related to phase A that is coupled to the second power converter 360. In other cases, circulating currents may form in a manner that passes through the first power converter via the conductors coupled to the first converter for phases A & B, then through the second power converter via the conductors coupled to the second power converter for phases A & B. In yet other cases, circulating currents can form any suitable means as enabled by the parallel electrical connection of multiple power converters to a machine, whether associated with a single electrical phase or multiple electrical phases. Circulating electrical currents generally do not produce useful power and/or useful torque and can cause excessive heating of the power converters 355, 360, and 365 and/or the machine 350. The conductors associated with phase B and phase C can also be subject to circulating common mode electrical current. The circulating common mode electrical current can be generated by minor imbalances between the output power of the power converters 355, 360, 365. Circulating common mode electrical current can also be generated by minor imbalances in generator electromotive force (EMF) or voltage, minor imbalances in electrical resistance or impedances in the power converters 355, 360, 365 or in the machine 350, or minor imbalances between parallel generator segments.

Referring back to FIG. 3a, the configuration shown in FIG. 3a has advantages over the configuration shown in FIG. 3b such that the configuration shown in FIG. 3a is less subject to imbalances between the power converters 320, 325, and 330. For example, the output voltages, generator back EMF, and internal impedances in the power converters 320, 325, 330 or in the segmented machine 345 are isolated from one segment to another. The segmentation substantially reduces or eliminates the circulating electrical currents described with respect to FIG. 3b.

FIG. 4a illustrates a machine segment 400 having four negative terminals 410 and four positive terminals 405. Machine segment 400 can be substantially similar to machine segments 305, 310, and 315 as described with respect to FIG. 3a. A portion of machine segment 400 can also be functionally and structurally similar to laminated composite assembly 200 as described with respect to FIG. 2a. Positive terminals 405 and negative terminals 410 can be functionally and structurally similar to terminals 245, 250, 255, 260 as described with respect to FIG. 2a.

Although FIG. 4a shows four negative terminals 410 and four positive terminals 405, machine segment 400 can have any number of positive terminals and any number of negative terminals. Because each phase winding within machine segment 400 can be associated with a positive terminal and a negative terminal, each phase winding can be associated with two terminals (one positive and one negative). Each phase winding can include one or more coils, such as, for example, two coils as shown in FIG. 2a. In some embodiments, each phase winding within a machine segment can be associated with any other number of terminals that provide electrical access to the machine segment. Furthermore, while FIG. 4a shows positive terminals 405 alternating with negative terminals 410, the order of terminals can be in any configuration.

The machine segment 400 can include a laminated composite assembly structurally and/or functionally similar to laminated composite assembly 200 as described with respect to FIG. 2a. As described in FIG. 2a, each positive terminal 405 can be associated with a phase winding within machine segment 400. Each phase winding can also be associated with a negative terminal 410, such that each positive terminal 405 has a corresponding negative terminal 410. Additionally, each phase winding can be associated with an electrical phase, such that each positive terminal 405 and each negative terminal 410 can be associated with an electrical phase. Within the machine segment 400, each phase winding can be electrically isolated from the other machine windings. For example, as shown in FIG. 4a, machine segment can have four electrical phases, with one positive and one negative terminal associated with each electrical phase. The positive terminal 405 and the negative terminal 410 for each electrical phase can be electrically isolated from each of the other positive terminals 405 and negative terminals 410 because the phase windings to which each terminal is associated can be electrically isolated from other phase windings.

In some embodiments, phase windings within machine segment 400 can each be of the same electrical phase, or any number of electrical phases. For example, two positive terminals 405 and two negative terminals 410 can be associated with phase windings of the same electrical phase and the remaining two positive terminals 405 and two negative terminals 410 can be associated with phase windings of a second electrical phase such that machine segment 400 has two electrical phases rather than four.

As shown in FIG. 4a, the positive terminals 405 and the negative terminals 410 can be externally accessible to the machine segment 400. The external accessibility of the terminals 405, 410 make it possible for the machine segment 400 to be electrically removably coupled to other elements of a machine. For example, using the terminals 405 and 410, machine segment 400 can be externally and removably electrically coupled to a circuit that forms a portion of a machine. The terminals can be, for example, externally and removably electrically coupled to a power converter, an external load, an external source, a device that can act as a source in a first mode of operation and a load in a second mode of operation, and/or any other suitable circuit. An example of an external load circuit can be, for example, an electrical power distribution grid. In some embodiments, the machine segment 400 can be a portion of a generator machine such that the power output by the generator can be supplied to the power grid. An example of an external source circuit can be, for example, any power source that provides power to the machine segment 400. In some embodiments, the machine segment 400 can be a portion of a motor machine such that the machine receives input power to operate.

Figure 5:
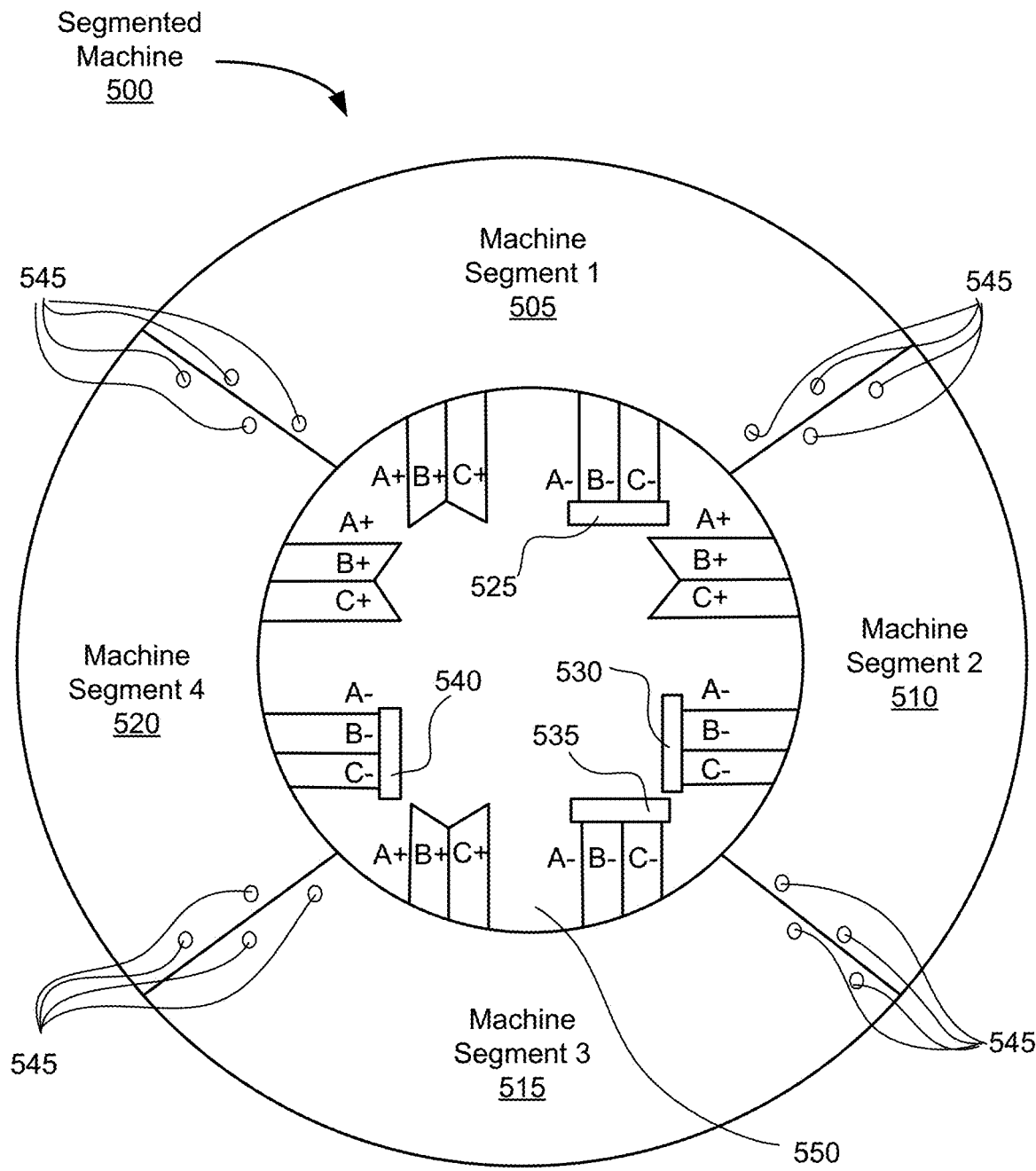
FIG. 5 illustrates multiple machine segments, according to an embodiment.

Machine segment 400 can be mechanically removably coupled as well. For example, multiple machine segments 400 can be mechanically removably coupled together as described below in more detail with respect to FIG. 5. Because the machine segment 400 can be an arc shape, multiple machine segments 400 can be mechanically coupled together end to end to form a circular shape, as shown in FIG. 5. As described further with respect to FIGS. 5 and 6, the machine segments 400 can be mechanically removably coupled to form a circular shape such that they collectively define at least a portion of a stator or rotor of a multi-phase machine. In other embodiments, the machine segments 400 can be mechanically removably coupled to form any other shape, for example the segments could be linearly coupled to support linear motion or coupled in an arc such that the segments are arced across a different dimension to support, for example, spherical motion.

Because machine segment 400 can be both mechanically removably coupled and externally and removably electrically coupled at the terminals, the machine segment 400 can be removed from a system and replaced. For example, if machine segment 400 experiences a failure, machine segment 400 can be mechanically and electrically decoupled from the machine to which it is coupled, and replaced with a properly functioning machine segment 400. Similarly, machine segment 400 can be decoupled from the machine to which it is coupled and replaced with a different machine segment to put the overall machine in a different configuration, as described in more detail below with respect to FIG. 5.

In some embodiments, machine segment 400 can be externally and removably electrically coupled to a second segment 400 such that coils within each segment 400 are not all electrically isolated. For example, the first segment (e.g., laminated composite assembly 200) can include two coils that are electrically isolated (e.g., as including coils 215 and 220) within the first segment, each coil being, for example associated with a different electrical phase (e.g., phase A and phase B). The two coils can be electrically coupled to two coils (e.g. as including coils 215 and 220) from a second segment 400, respectfully. Each coil in the second segment 400 can be associated with an electrical phase (e.g., phase A and phase B, respectively). In such a configuration, each segment 400 can be mechanically removably coupled to other segments 400, but each segment 400 can have the coils associated with common electrical phases electrically coupled to the coils within other segments 400 associated with that electrical phase (e.g., the coils from the first segment associated with phase A being electrically coupled to the coils from the second segment associated with phase A, and the coils from the first segment associated with phase B being electrically coupled to the coils from the second segment associated with phase B). In other embodiments, coils of different electrical phases on different segments can be externally and removably electrically coupled in a star or delta configuration to define a multi-phase machine that includes coils on multiple segments. In such embodiments, some of the coils from the first segment 400 can be externally and removably electrically coupled to the coils in the second segment 400.

FIG. 4b illustrates a machine segment 415 having three positive terminals 420 and three negative terminals 425. Machine segment 415 can be structurally and functionally similar to machine segment 400. Machine segment 415, however, can have three electrical phases, each electrical phase being associated with a different positive terminal 420, negative terminal 425, and phase winding including one or more coils.

FIG. 4c illustrates a machine segment 430 having three negative terminals (A−, B−, and C−), three positive terminals (A+, B+, and C+), a first region 435, and a second region 440. Machine segment 430 can be structurally and functionally similar to machine segment 400, but can provide a different configuration for the negative terminals (A−, B−, and C−) and the positive terminals (A+, B+, and C+) than shown and described with respect to machine segment 400 of FIG. 4a. While the terminals alternate polarity, there are two distinct regions of terminals, each having one terminal for each electrical phase included in the machine segment 430. For example, the first region 435 includes positive terminals for phases A and C (A+ and C+) and a negative terminal for phase B (B−). The opposite polarity terminals for each electrical phase can then be included in the second region 440 such that the second region 440 includes negative terminals for phases A and C (A− and C−) and a positive terminal for phase B (B+). In some embodiments the polarity of each terminal can be determined by the circuit to which the terminal is electrically coupled. For example, terminal B− can have a negative polarity because it is electrically coupled to the associated terminal of the circuit to which it is electrically coupled.

The first region 435 and the second region 440 can be mutually exclusive of each other, as shown. For example, the first region 435 can include terminals A+, B− and C+, none of which are included in the second region 440. Similarly, the second region can include the terminals A−, B+, and C−, none of which are included in the first region 435.

FIG. 4d illustrates a machine segment 445 having three negative terminals (A−, B−, and C−), three positive terminals (A+, B+, and C+), a first region 450, and a second region 455. Machine segment 445 can be structurally and functionally similar to machine segment 400. As shown in FIG. 4d, the positive terminals (A+, B+, and C+) can be grouped in a first region 450 and the negative terminals (A−, B−, and C−) can be grouped in a second region 455. The first region 450 and the second region 455 can be separate and distinct from each other. As shown in FIG. 4c, the natural configuration can be alternating polarities of the electrical phases in each region (i.e., the first region contains phases A−, B+, and C−). The configuration in FIG. 4d can be generated by reversing the coil and/or winding connections of an electrical phase between terminal regions within a machine segment. As described above, the polarity of each terminal can be determined by the circuit to which the terminal is electrically coupled. For example, terminal A+ can have a positive polarity because it is electrically coupled to the associated terminal of the circuit to which it is electrically coupled.

In this embodiment, the first region 450 and the second region 455 can also be mutually exclusive of each other, though the terminals contained in each region are different than those contained in the two regions described in FIG. 4c. For example, the first region 450 can include terminals A+, B+, and C+, none of which are included in the second region 455. Similarly, the second region 455 can include terminals A−, B−, and C−, none of which are included in the first region 450.

Figure 4E:
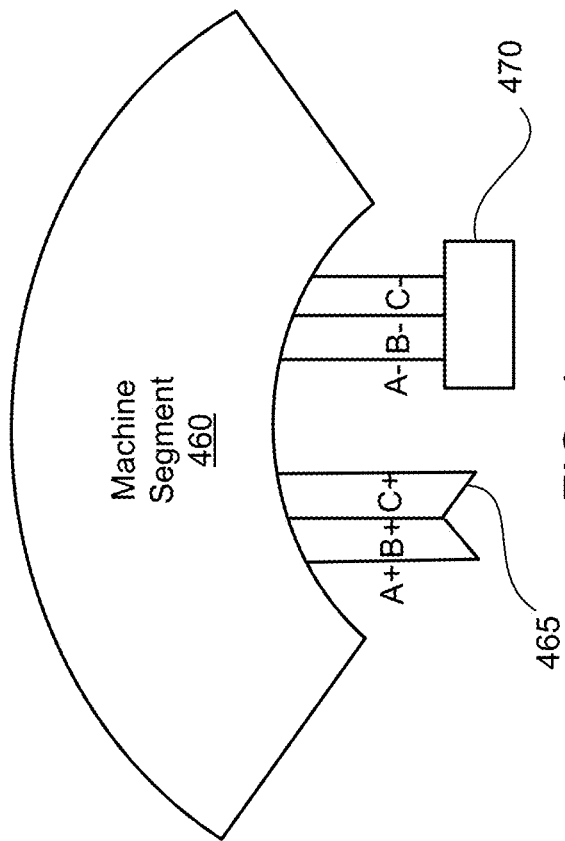

FIG. 4e illustrates a machine segment 460 with three positive terminals (A+, B+, and C+), three negative terminals (A−, B−, and C−), an external star connection 465, and an external circuit 470. Machine segment 460 can be structurally and functionally similar to machine segment 400. Similar to machine segment 445 as described with respect to FIG. 4d, the positive terminals (A+, B+, and C+) are grouped in a region and the negative terminals (A−, B−, and C−) are grouped in a region. The positive terminals (A+, B+, and C+) can be externally and removably electrically coupled in a star connection 465 configuration. In other embodiments, the negative terminals (A−, B−, and C−) can be externally and removably electrically coupled in a star connection configuration instead of the positive terminals (A+, B+, C+) and the positive terminals (A+, B+, C+) can be externally and removably electrically coupled to an external circuit 470. Similarly, either or both the positive terminals (A+, B+, and C+) or the negative terminals (A−, B−, and C−) can be externally and removably electrically coupled in any other configuration, including a delta configuration.

The negative terminals (A−, B−, and C−) can be externally and removably electrically coupled to a circuit 470. Circuit 470 can be any suitable circuit including, for example, a load circuit, a source circuit, and/or a power converter. Similarly, as described above, the positive terminals (A+, B+, and C+) can be externally and removably electrically coupled to external circuit 470 and negative terminals (A−, B−, C−) can be externally and removably electrically coupled together.

Figure 4F:
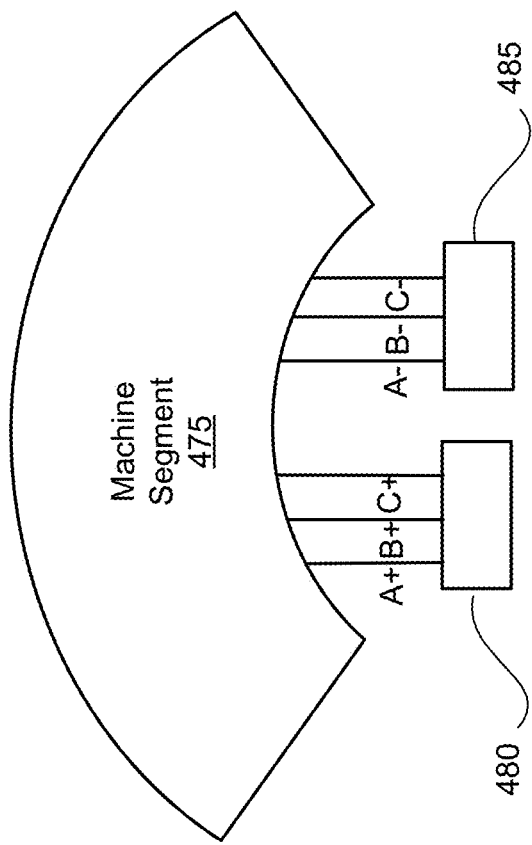

FIG. 4f illustrates a machine segment 475 with three positive terminals (A+, B+, CJ, three negative terminals (A−, B−, C−), and external circuits 480, 485. Machine segment 475 can be structurally and functionally similar to machine segment 400 of FIG. 4a. Similar to machine segment 445 as described with respect to FIG. 4d, the positive terminals (A+, B+, and C+) are grouped in a region and the negative terminals (A−, B−, and C−) are grouped in a region. The positive terminals (A+, B+, and C+) can be externally and removably electrically coupled to external circuit 480 and the negative terminals (A−, B−, and C−) can be externally and removably electrically coupled to a second external circuit 485. The external circuits 480 and 485 can be any suitable electrical circuit, for example, a power converter, a load circuit, or a source circuit. In some embodiments, the external circuits 480 and 485 can be the same type of circuit (e.g., 480 is a power converter and 485 is a second power converter. In yet other embodiments, the external circuits 480 and 485 can be the same external circuit (e.g., 480 is a power converter and 485 is the same power converter). For example, external circuit 480 can be a power converter and external circuit 485 can be the same power converter. In other embodiments, external circuits 480 and 485 can be distinct circuits. For example, external circuit 480 can be a power converter and external circuit 485 can be a second power converter.

Machine segments 400, 425, 450, and 470 of FIGS. 4a-4f can form a portion of a stator in a machine. For example, FIG. 5 illustrates multiple machine segments mechanically coupled to form a segmented machine 500 for a three-phase electrical system. The segmented machine 500 has multiple mechanical couplings 545, four machine segments 505, 510, 515, 520, and the segmented machine 500 defines an interior circular area 550. Each machine segment has six terminals (A+, B+, C+, A−, B−, C−). Each machine segment 505, 510, 515, and 520 can be functionally and structurally similar to machine segment 460 as described in FIG. 4e. In some embodiments, each machine segment 505, 510, 515, 520 can be structurally and functionally similar to any of the machine segments (400, 415, 530, 445, 460, 475) described in FIGS. 4a-4f. In some embodiments, the machine segments 505, 510, 515, 520 can be configured differently from each other. For example, in some embodiments, the first machine segment 505 can have terminal connections configured similar to machine segment 475 of FIG. 4f and the second machine segment 510 can have terminal connections configured similar to machine segment 460 of FIG. 4e.

Each machine segment 505, 510, 515, and 520 has three electrical phases (A, B, and C), with the positive terminals of each externally and removably electrically coupled in a star configuration and the negative terminals externally and removably electrically coupled to an external circuit 525, 530, 535, 540. As shown in FIG. 5, the electrical coupling can be external to the segment. For example, circuit 525 is external to the first machine segment 505 and can be electrically coupled external to the first machine segment 505.

The machine segments 505, 510, 515, and 520 are mechanically coupled together using mechanical couplings 545. Mechanical couplings 545 can be any suitable coupling device that allows the machine segments 505, 510, 515, and 520 to be decoupled and removed from the machine. For example, mechanical couplings 545 can be bolts, clips, steel bushings, a dovetail slotted connection, and/or any other suitable coupling. In other embodiments, such mechanical couplings can be part of a support structure (not shown in FIG. 5). Such a support structure can support and mechanically couple each machine segment. In such embodiments, each machine segment can be mechanically coupled to the other machine segments by the support structure. In still other embodiments, the machine segments can be directly mechanically coupled to both a support structure and the other machine segments.

While machine segments 505, 510, 515, and 520 are mechanically coupled to form a stator, the machine segments 505, 510, 515, and 520 are electrically isolated from each other, as described with respect to segments 305, 310, and 315 of FIG. 3a. The positive terminals (A+, B+, and C+) of each machine segment 505, 510, 515, and 520 can be externally and removably electrically coupled in a star configuration, as shown. In some embodiments, the positive terminals (A+, B+, and C+) can be electrically coupled in any other suitable configuration, such as, for example, a delta configuration.

The negative terminals (A−, B−, and C−) of each machine segment 505, 510, 515, and 520 can be externally and removably electrically coupled to an external circuit 525, 530, 535, 540. External circuits 525, 530, 535, and 540 can be any suitable circuit, such as, for example, a power converter, a load circuit, and/or a source circuit. In some embodiments, for example, similar to the system described in FIG. 3a, each machine segment 505, 510, 515, and 520 can each be externally and removably electrically coupled to a power converter through its negative terminals (A−, B−, and C−). In other embodiments, the external circuits 525, 530, 535, and 540 are not the same type of circuit (e.g., each a power converter) but can include multiple types of circuits. For example, in some embodiments, the first machine segment 505 can be externally and removably electrically coupled through its negative terminals (A−, B−, and C−) to a power converter and the second machine segment 510 can be externally and removably electrically coupled through its negative terminals (A−, B−, and C−) to a load circuit.

Because the machine segments 505, 510, 515, and 520 can be removably mechanically coupled together and/or to a support structure, and the terminal connections can be electrically and mechanically removably coupled, as described in more detail above with respect to FIG. 4a, the machine segments 505, 510, 515, and 520 can be decoupled, such that any machine segment 505, 510, 515, and/or 520 can be removed from the machine and be replaced with a different machine segment. For example, the first machine segment 505 can be configured similar to machine segment 460 of FIG. 4e. If the first machine segment 505 experiences a failure, it can be decoupled from the remaining segments in the segmented machine 500 and replaced with a properly functioning machine segment configured similar to machine segment 460 of FIG. 4e. In another embodiment, the first machine segment 505 can be replaced with a different machine segment of a different configuration, for example machine segment 475 of FIG. 4f, in order to effect a change in the configuration of segmented machine 500. As another example, the first machine segment 505 can be configured in a star configuration, as shown in FIG. 5. The first machine segment 505 can be electrically and mechanically decoupled from the segmented machine 500 and external circuit 525 and replaced with a different machine segment that is configured in a delta configuration instead of a star configuration.

In some configurations, the segmented machine 500 can have a movable portion (i.e., a rotor) that is placed in the interior area 550 defined by segmented machine 500 (or other suitable area depending on the type of machine). The movable portion can be segmented such that each machine segment (505, 520, 515, 520) substantially aligns with a segment of the movable portion. Once aligned, the machine segments (e.g., stator portion) can be mechanically removably coupled to an associated segment of the movable portion (e.g., rotor portion). The combination of the machine segment (e.g., stator portion) and the movable portion (e.g., rotor portion) can be coupled to a machine support structure such that the segment combination can be removed from the machine and moved to reassemble or replaced with a different segment combination. The mechanical coupling of the machine segment 505, 510, 515, 520 (e.g., stator portion) with the associated movable portion (e.g., rotor portion) can be accomplished using bolts, pins, or any other suitable fastening mechanism. The machine support structure can be any suitable structure that can be coupled to the segment combination such that the machine support structure provides support for removal and reattachment of the segment combination to an electromagnetic machine. Mechanical couplings and support structures for segments are disclosed more fully in U.S. Pat. No. 9,154,024 to Jore, et al., filed Jun. 2, 2011, and entitled "Systems and Methods for Improved Direct Drive Generators," which is incorporated by reference herein in its entirety.

Figure 6:
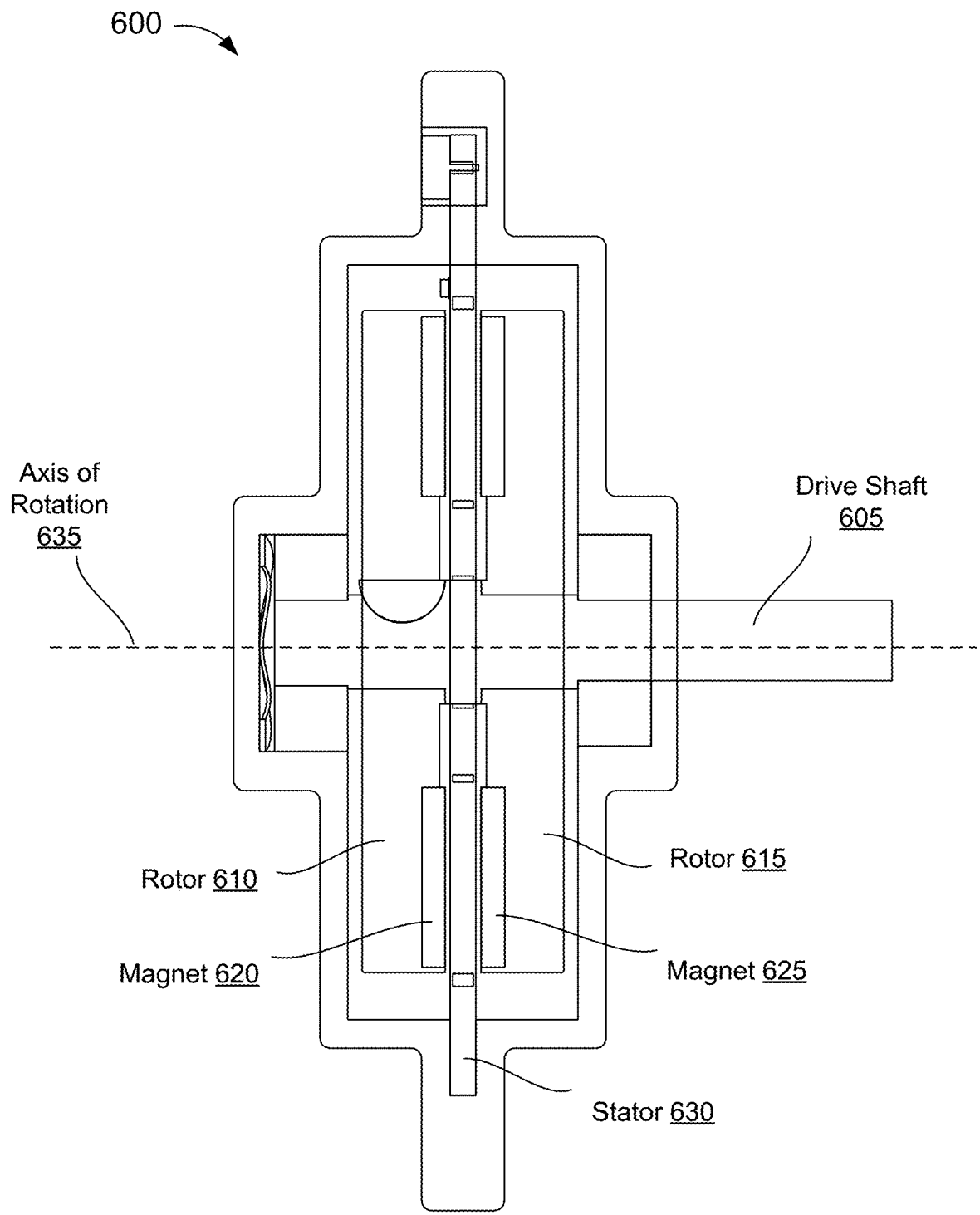
FIG. 6 illustrates a cross-sectional view of an axial flux machine structure, according to an embodiment.

In use, segmented machine 500 can be part of an electrical machine. For example, FIG. 6 is a schematic illustration of a cross-sectional view of an axial flux machine 600 having a drive shaft 605, rotor segments 610 and 615, a stator 630, and magnets 620 and 625. The machine in FIG. 6 can be, for example, a wind turbine generator. In some embodiments, the laminated composite assemblies and/or machine segments of FIGS. 1-4f can be a portion of a laminated composite assembly defining a machine winding in a stator (e.g., stator 630). In some embodiments, segmented machine 500 can be stator 630. Further details regarding generators and machine windings are provided in U.S. Pat. No. 7,109,625, issued Sep. 19, 2006, and entitled "Conductor Optimized Axial Field Rotary Energy Device," which is incorporated herein by reference in its entirety.

In some embodiments, drive shaft 605 can be fixedly coupled to rotor segments 610, 615 (formed of a magnetically permeable material such as steel), and magnets 620, 625 can be fixedly coupled to rotor segments 610, 615. The end of drive shaft 605 that is not fixedly coupled to rotors 610, 615 can protrude through an opening of the generator housing. In some embodiments, the protruding end of drive shaft 605 can be coupled to an exterior device, such as blades of a wind turbine. When wind causes the blades of the wind turbine to move, drive shaft 605 rotates, causing rotor segments 610, 615 to rotate, in turn causing magnets 620, 625 to rotate.

Magnets 620, 625 can be rings that have poles N and S that alternate around the ring. In some embodiments, magnets 620, 625 can be made of individual segments. Magnets 620, 625 can be magnetic material including rare earth metals such as alloys of neodymium, iron, and/or boron. Magnets 620, 625 can have any even number of poles.

Stator 630 can be a laminated composite assembly, including a PCB, with conductive layers that are electrically coupled with electrical interconnects as described with respect to the previous figures. The stator 630 can be a segmented stator, for example, and can include any number of stator portions. For example, segmented machine 500 of FIG. 5 can be stator 630. Each stator portion can include at least one laminated composite assembly (e.g., at least one PCB), such as, for example, those described herein with respect to FIGS. 1-4f. For example, the laminated composite assembly 200 described with respect to FIG. 2a, can form a stator portion of a segmented stator. Multiple laminated composite assemblies 200 can be coupled together to form a segmented stator. As previously described, machine segments 305, 310, 315 of FIGS. 3a and 400, 415, 430, 445, 460, 475 of FIGS. 4a-4f can be laminated composite assemblies, such as laminated composite assembly 200 of FIG. 2a. As described with respect to FIG. 5, multiple machine segments can be coupled together to form a segmented stator.

In use, magnets 620 and 625 can be positioned so that an N pole on magnet 620 faces an S pole on magnet 625. The alternating magnetic poles of magnets 620, 625 generate a circumferentially alternating magnetic flux in the air gap formed between the rotor segments 610, 615, where the stator is located. A force (e.g., wind) can cause rotation of drive shaft 605 around the axis of rotation, which causes rotor segments 610, 615 to rotate with drive shaft 605, in turn causing magnets 620, 625 to rotate around drive shaft 605 (i.e., around the axis of rotation 635). The rotation of magnets 620, 625 causes the alternating magnetic flux to move with respect to the stator 630, which can induce an alternating voltage in the phase windings contained in stator 630 (e.g., the conductors of the laminated composite assembly).

In some embodiments, an electrical current can be applied to stator 630, which can produce Lorentz forces between the flowing electrical current and the magnetic field generated by magnets 620, 625. The resulting torque can cause rotor segments 610, 615 to rotate, in turn causing drive shaft 605 to rotate. Thus, in some embodiments, the device in FIG. 6 can function as a motor rather than a generator.

In some embodiments, the laminated composite assemblies and/or the machine segments of FIGS. 1-4f can be a portion of a laminated composite assembly defining a machine winding in a stator (e.g., stator 630). The laminated composite assemblies 100 and/or 200 can include operative portions on each layer and end turn portions on a subset of the layers. As discussed above, the electrical current in the layers of laminated composite assembly 100, 200 can be induced due to the magnets 620, 625 rotating around drive shaft 605.

The embodiments disclosed herein (e.g., the laminated composite assemblies and/or the winding portions) can be used in at least one of an axial flux machine, a radial flux machine, a linear machine and/or any other suitable machine. In other embodiments, conductors may be constructed in a substantially spiral, helical, or other orientation where conductive wire is disposed around a core element, which may be formed from a ferromagnetic or non-ferromagnetic material.

In some embodiments, the machine segments described herein can include one or more protection elements. For example, a protection element, such as a fuse, circuit breaker, inductor, active or passive filter, diode, and/or the like, can be disposed within the circuits to protect one or more circuit components. In some embodiments, for example, a protective element can be associated with a coil and can change configuration such that electrical current is obstructed or substantially impeded from flowing through the protective element and/or its associated coil when abnormal operation is detected (e.g., abnormally high electrical current). In some embodiments, the protective element and/or its associated coil are removed from an electrical circuit in the second configuration.

In some embodiments, protection elements can be disposed within a machine segment. For example, laminated composite assembly 200 can include one or more protection elements disposed thereon. In some embodiments, protection elements can be disposed outside a machine segment and within the electrical circuit coupling multiple machine segments together. For example, protection elements can be disposed within the electrical couplings between machine segments shown in FIG. 5. Protective elements are described more fully in U.S. Pat. No. 8,941,961 to Banerjee, et al., filed Aug. 21, 2013, and entitled "Methods and Apparatus for Protection in a Multi-Phase Machine," which is incorporated by reference herein in its entirety.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, while shown and described above with respect to laminated composite assemblies, the stator portions and/or phase windings can apply to other electrical constructs. For example, the conductors described herein can be wire-wound windings, which can also define and/or be aligned in one or more layers.

Although various embodiments have been described as having particular features and/or combinations of components, other embodiments are possible having a combination of any features and/or components from any of embodiments as discussed above.

What is claimed is:

1. An apparatus, comprising:
  a first machine segment having a first plurality of terminals, each terminal from the first plurality of terminals configured to electrically removably couple a different coil from a first plurality of coils to a first electrical circuit, the first electrical circuit being external to the first machine segment, each coil from the first plurality of coils being electrically isolated from the remaining coils from the first plurality of coils within the first machine segment; and
  a second machine segment having a second plurality of terminals, each terminal from the second plurality of terminals configured to electrically removably couple a different coil from a second plurality of coils to a second electrical circuit, the second electrical circuit being external to the second machine segment, each coil from the second plurality of coils being electrically isolated from the remaining coils from the second plurality of coils within the second machine segment, the second machine segment configured to be mechanically removably coupled to the first machine segment to collectively define at least a portion of at least one of a stator or a rotor, the second plurality of coils being electrically isolated from the first plurality of coils within the at least one of the stator or the rotor when at least one of the first plurality of coils or the second plurality of coils is carrying an electric current.

2. The apparatus of claim 1, wherein at least one of the first electrical circuit or the second electrical circuit is a power converter.

3. The apparatus of claim 1, wherein at least one of the first electrical circuit or the second electrical circuit is a load circuit.

4. The apparatus of claim 1, wherein at least one of the first electrical circuit or the second electrical circuit is a source circuit.

5. The apparatus of claim 1, wherein the first electrical circuit is a first power converter having an input portion and an output portion, each terminal from the first plurality of terminals is configured to be electrically removably coupled to the input portion of the first power converter,
  the second electrical circuit is a second power converter having an input portion and an output portion, each terminal from the second plurality of terminals is configured to be electrically removably coupled to the input portion of the second power converter,
  the input portion of the second power converter is electrically isolated from the input portion of the first power converter, the output portion of the second power converter is electrically coupled to the output portion of the first power converter.

6. The apparatus of claim 1, wherein the first electrical circuit is electrically isolated from the second electrical circuit,
  the first electrical circuit is configured to electrically connect the first plurality of coils external to the first machine segment such that the first machine segment forms one of a first multi-phase star-connected stator segment or a first multi-phase star-connected rotor segment,
  the second electrical circuit is configured to electrically connect the second plurality of coils external to the second machine segment such that the second machine segment forms one of a second multi-phase star-connected stator segment or a second multi-phase star-connected rotor segment.

7. The apparatus of claim 1, wherein the first electrical circuit is electrically isolated from the second electrical circuit,
  the first electrical circuit is configured to electrically connect the first plurality of coils external to the first machine segment such that the first machine segment forms one of a first multi-phase delta-connected stator segment or a first multi-phase delta-connected rotor segment,
  the second electrical circuit is configured to electrically connect the second plurality of coils external to the second machine segment such that the second machine segment forms one of a second multi-phase delta-connected stator segment or a second multi-phase delta-connected rotor segment.

8. An apparatus, comprising:
  a first machine segment having a coil, the coil of the first machine segment configured to be electrically removably coupled to a first electrical circuit external to the first machine segment; and a second machine segment having a coil, the coil of the second machine segment configured to be electrically removably coupled to a second electrical circuit external to the second machine segment, the second machine segment configured to be mechanically removably coupled to the first machine segment to collectively define a portion of at least one of a stator or a rotor, the second machine segment being electrically isolated from the first machine segment within the at least one of the stator or the rotor when at least one of the coil of the first machine segment or the coil of the second machine segment is carrying an electric current.

9. The apparatus of claim 8, wherein the first machine segment includes a first plurality of coils, each coil from the first plurality of coils being electrically isolated within the first machine segment from the remaining coils from the first plurality of coils, each coil from the first plurality of coils being associated with a different electrical phase from a plurality of electrical phases, the coil of the first machine segment being from the first plurality of coils and being associated with an electrical phase from the plurality of electrical phases, and the second machine segment includes a second plurality of coils, each coil from the second plurality of coils being electrically isolated within the second machine segment from the remaining coils from the second plurality of coils, each coil from the second plurality of coils being associated with a different electrical phase from the plurality of electrical phases, the coil of the second machine segment being from the second plurality of coils and being associated with the electrical phase from the plurality of electrical phases.

10. The apparatus of claim 8, wherein the first machine segment includes a first terminal electrically connected to the coil of the first machine segment and a second terminal electrically connected to the coil of the first machine segment, the first terminal of the first machine segment having a first polarity and the second terminal of the first machine segment having a second polarity substantially opposite the first polarity, at least one of the first terminal of the first machine segment or the second terminal of the first machine segment is configured to electrically removably couple the coil of the first machine segment to the first electrical circuit, and the second machine segment includes a first terminal electrically connected to the coil of the second machine segment and a second terminal electrically connected to the coil of the second machine segment, the first terminal of the second machine segment having the first polarity and the second terminal of the second machine segment having the second polarity, at least one of the first terminal of the second machine segment or the second terminal of the second machine segment is configured to electrically removably couple the coil of the second machine segment to the second electrical circuit.

11. The apparatus of claim 8, wherein the first electrical circuit is a first power converter and the second electrical circuit is a second power converter, an input of the first power converter being electrically isolated from an input of the second power converter.

12. The apparatus of claim 8, wherein the first machine segment includes a protective element disposed within the coil of the first machine segment and configured to protect the coil of the first machine segment from at least one of an excess electrical current, an excess voltage, or an excess mechanical load, and the second machine segment includes a protective element disposed within the coil of the second machine segment and configured to protect the coil of the second machine segment from at least one of an excess electrical current, an excess voltage, or an excess mechanical load.

13. The apparatus of claim 8, wherein the first electrical circuit is a source circuit when the first electrical circuit is in a first configuration and a load circuit when the first electrical circuit is in a second configuration, and the second electrical circuit is a source circuit when the second electrical circuit is in a first configuration and a load circuit when the second electrical circuit is in a second configuration.

14. An apparatus, comprising:

a first coil included in a machine segment forming a portion of a segmented multi-phase stator, the first coil being associated with a first electrical phase in the segmented multi-phase stator, the first coil having a first terminal configured to electrically removably couple the first coil to a first electrical circuit external to the machine segment, the first electrical circuit being associated with the first electrical phase;

a second coil included in the machine segment, the second coil being associated with a second electrical phase different from the first electrical phase, the second coil having a second terminal configured to electrically removably couple the second coil to a second electrical circuit external to the machine segment, the second electrical circuit being associated with the second electrical phase; and a third coil included in the machine segment, the third coil being associated with a third electrical phase different from the first electrical phase and the second electrical phase, the third coil having a third terminal configured to electrically removably couple the third coil to a third electrical circuit external to the machine segment, the third electrical circuit being associated with the third electrical phase, the first electrical circuit, the second electrical circuit, and the third electrical circuit configured to be electrically coupled external to the machine segment, each of the first coil, the second coil, and the third coil being electrically isolated from the remaining coils within the segmented multi-phase stator.

15. The apparatus of claim 14, wherein the first electrical circuit, the second electrical circuit, and the third electrical circuit are electrically coupled external to the machine segment to define a multi-phase star-connected stator segment.

16. The apparatus of claim 14, wherein the first electrical circuit, the second electrical circuit, and the third electrical circuit are electrically coupled external to the machine segment to define a multi-phase delta-connected stator segment.

17. The apparatus of claim 14, wherein the machine segment is a first machine segment, the first machine segment configured to be mechanically removably coupled to a second machine segment having a first coil associated with the first electrical phase, a second coil associated with the second electrical phase, and a third coil associated with the third electrical phase, the first machine segment being electrically isolated from the second machine segment within the segmented multi-phase stator, the first coil of the second machine segment being electrically removably coupled to a fourth electrical circuit external to the second machine segment, the second coil of the second machine segment being electrically removably coupled to a fifth electrical circuit external to the second machine segment, and the third coil of the second machine segment being electrically removably coupled to a sixth circuit external to the second machine segment, the fourth electrical circuit, the fifth electrical circuit, and the sixth electrical circuit configured to be electrically coupled external to the second machine segment, each of the first coil, the second coil, and the third coil of the second machine segment being electrically isolated within the segmented multi-phase stator.

18. The apparatus of claim 14, wherein the first electrical circuit is a first portion of a multi-phase power converter, the second electrical circuit is a second portion of the multi-phase power converter, and the third electrical circuit is a third portion of the multi-phase power converter, the first portion of the multi-phase power converter is associated with the first electrical phase, the second portion of the multi-phase power converter is associated with the second electrical phase, and the third portion of the multi-phase power converter is associated with the third electrical phase.

19. The apparatus of claim 14, wherein the first electrical circuit is a first portion of a multi-phase power converter having a first input and a first output, the second electrical circuit is a second portion of the multi-phase power converter having a second input and a second output, and the third electrical circuit is a third portion of the multi-phase power converter having a third input and a third output, the first coil being electrically removably coupled to the first input, the second coil being electrically removably coupled to the second input, and the third coil being electrically removably coupled to the third input,
   each of the first input, the second input, and the third input being electrically isolated from the remaining inputs of the multi-phase power converter, and
   each of the first output, the second output, the third output being electrically connected to the remaining outputs external to the machine segment.

20. An apparatus, comprising:
   a first coil included in a machine segment from a plurality of machine segments configured to collectively form at least one of a segmented stator or a segmented rotor of a segmented electromagnetic machine, the first coil having a first end portion and a second end portion;
   a first terminal included in the machine segment from the plurality of machine segments and electrically coupled to the first end portion of the first coil, the first terminal having a first polarity and configured to be electrically removably coupled to an input of a power converter external to the machine segment from the plurality of machine segments; and
   a second terminal included in the machine segment from the plurality of machine segments and electrically coupled to the second end portion of the first coil, the second terminal having a second polarity different from the first polarity and configured to be electrically removably coupled to an electrical circuit external to the machine segment from the plurality of machine segments, the electrical circuit configured to electrically connect the first coil to at least a second coil included in the machine segment from the plurality of machine segments,
   the machine segment from the plurality of machine segments being electrically isolated from each remaining machine segment from the plurality of machine segments within the at least one of the segmented stator or the segmented rotor.

21. The apparatus of claim 20, wherein the machine segment from the plurality of machine segments includes the first coil, the second coil, and a third coil, the first coil being associated with a first electrical phase from a plurality of electrical phases, the second coil being associated with a second electrical phase from the plurality of electrical phases, and the third coil being associated with a third electrical phase from the plurality of electrical phases,
   the electrical circuit external to the machine segment from the plurality of machine segments configured to electrically connect the first coil, the second coil, and the third coil to define one of a multi-phase star-connected stator segment or a multi-phase star-connected rotor segment.

22. The apparatus of claim 20, wherein the machine segment from the plurality of machine segments includes the first coil, the second coil, and a third coil, the first coil being associated with a first electrical phase from a plurality of electrical phases, the second coil being associated with a second electrical phase from the plurality of electrical phases, and the third coil being associated with a third electrical phase from the plurality of electrical phases,
   the electrical circuit external to the machine segment from the plurality of machine segments configured to electrically connect the first coil, the second coil, and the third coil to define one of a multi-phase delta-connected stator segment or a multi-phase delta-connected rotor segment.

23. The apparatus of claim 20, wherein the input of the power converter is a first input of the power converter, the second coil is electrically connected to a third terminal included in the machine segment from the plurality of machine segments and configured to electrically connect the second coil to a second input of the power converter, the second input being electrically isolated from the first input.

24. The apparatus of claim 20, wherein the input of the power converter is a first input of the power converter, the second coil is electrically connected to a third terminal included in the machine segment from the plurality of machine segments and configured to electrically connect the second coil to a second input of the power converter, the second input being electrically isolated from the first input, and
   an output of the power converter configured to electrically connect, external to the machine segment from the plurality of machine segments, the first coil and the second coil to at least one of a load circuit or a source circuit.

25. The apparatus of claim 20, wherein the machine segment from the plurality of machine segments is a first machine segment from the plurality of machine segments, the power converter is a first power converter, and the electrical circuit is a first electrical circuit,
   the first machine segment from the plurality of machine segments configured to be mechanically removably coupled to a second machine segment from the plurality of machine segments having a first terminal configured to electrically connect a coil of the second machine segment from the plurality of machine segments to an input of a second power converter and a second terminal configured to electrically connect the coil of the second machine segment from the plurality of machine segments to a second electrical circuit, the second electrical circuit being external to the second machine segment from the plurality of machine segments, the first machine segment from the plurality of machine segments being electrically isolated from the second machine segment from the plurality of machine segments within the at least one of the segmented stator or segmented rotor.

* * * * *